(12) United States Patent
Tsutsui et al.

(10) Patent No.: US 10,569,173 B2
(45) Date of Patent: Feb. 25, 2020

(54) NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Keita Tsutsui, Kyoto (JP); Seiichi Yamaguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/972,490

(22) Filed: May 7, 2018

(65) Prior Publication Data
US 2018/0326302 A1 Nov. 15, 2018

(30) Foreign Application Priority Data

May 15, 2017 (JP) .................................. 2017-096371

(51) Int. Cl.
*A63F 13/5258* (2014.01)
*A63F 13/5252* (2014.01)
*A63F 13/86* (2014.01)
*A63F 13/837* (2014.01)
*A63F 13/56* (2014.01)
*A63F 13/335* (2014.01)

(52) U.S. Cl.
CPC ...... *A63F 13/5258* (2014.09); *A63F 13/5252* (2014.09); *A63F 13/837* (2014.09); *A63F 13/86* (2014.09); *A63F 13/335* (2014.09); *A63F 13/56* (2014.09)

(58) Field of Classification Search
CPC ................ A63F 13/525; A63F 13/5378; A63F 2300/6661; A63F 2300/6669; A63F 13/00
See application file for complete search history.

(56) References Cited

U.S. PATENT DOCUMENTS

| 2011/0244958 | A1* | 10/2011 | Nimura | ............... A63F 13/5252 463/31 |
| 2015/0306500 | A1* | 10/2015 | Edsall | ................. A63F 13/5258 463/31 |
| 2017/0225077 | A1* | 8/2017 | Kim | ....................... A63F 13/525 |

FOREIGN PATENT DOCUMENTS

| JP | 9-325683 | 12/1997 |
| JP | 2013-063296 | 4/2013 |
| JP | 2013-126559 | 6/2013 |

OTHER PUBLICATIONS

Notice of Reasons for Refusal dated Jul. 19, 2019 issued in JP Application No. 2017-096371 (4 pgs.).

* cited by examiner

*Primary Examiner* — Reginald A Renwick
(74) *Attorney, Agent, or Firm* — Nixon & Vanderhye PC

(57) ABSTRACT

In an example of a system, in a virtual space, a player camera that follows each player in a multiplay game, a bird's-eye camera that views the virtual space from a bird's-eye view, and an object camera that follows a predetermined object are set. A watcher watches the game by switching the player camera, the bird's-eye camera, and the object camera. In accordance with an operation of the watcher, the bird's-eye camera moves in the virtual space, and a height of the bird's-eye camera is determined in advance in accordance with a position. When virtual cameras are switched by the watcher, a game image from the virtual cameras during the switching is displayed.

27 Claims, 25 Drawing Sheets

F I G. 1
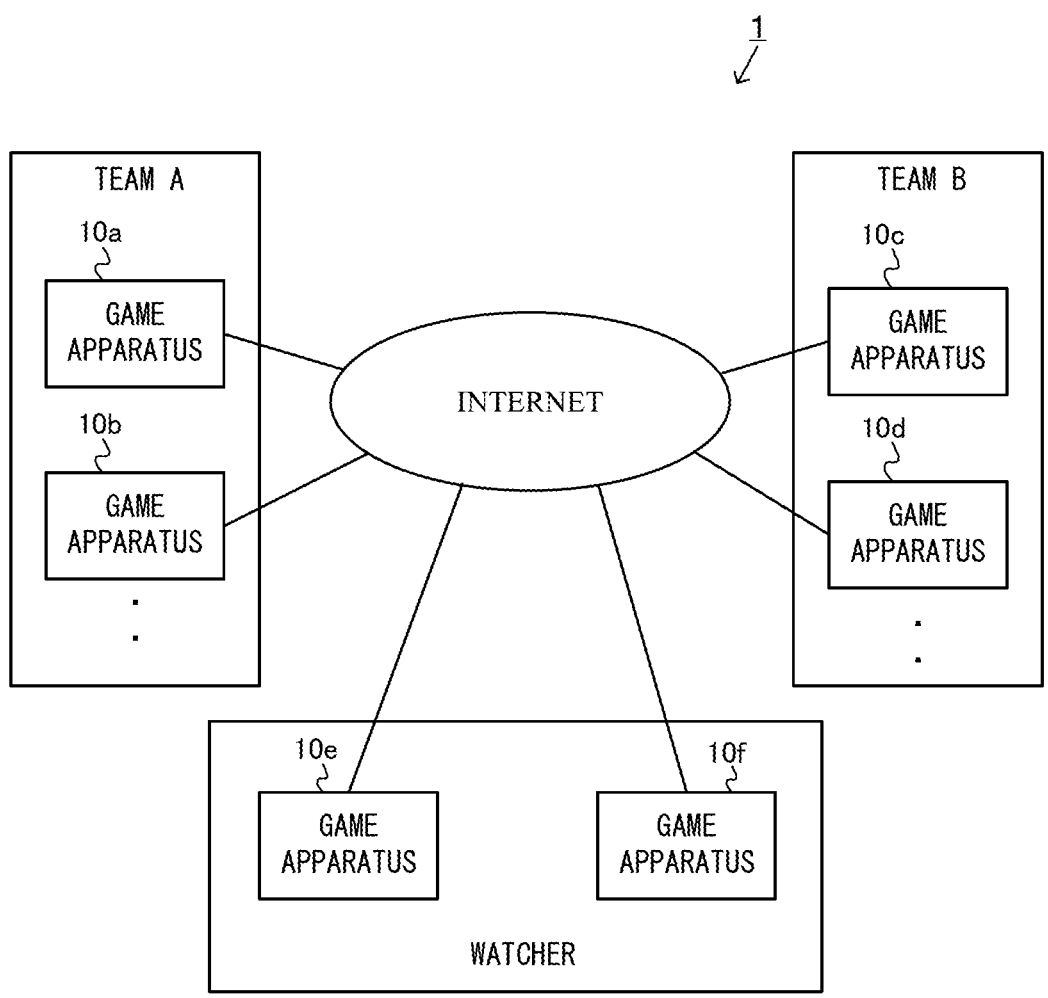

F I G. 6
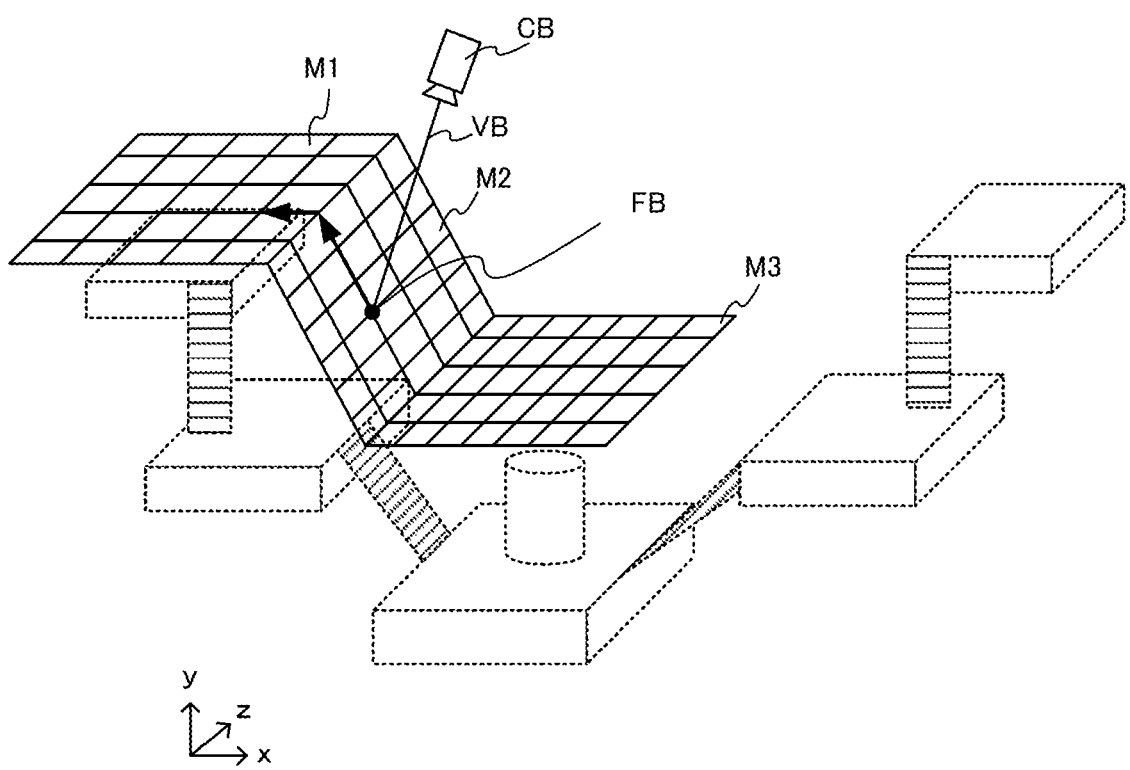

F I G. 1 1
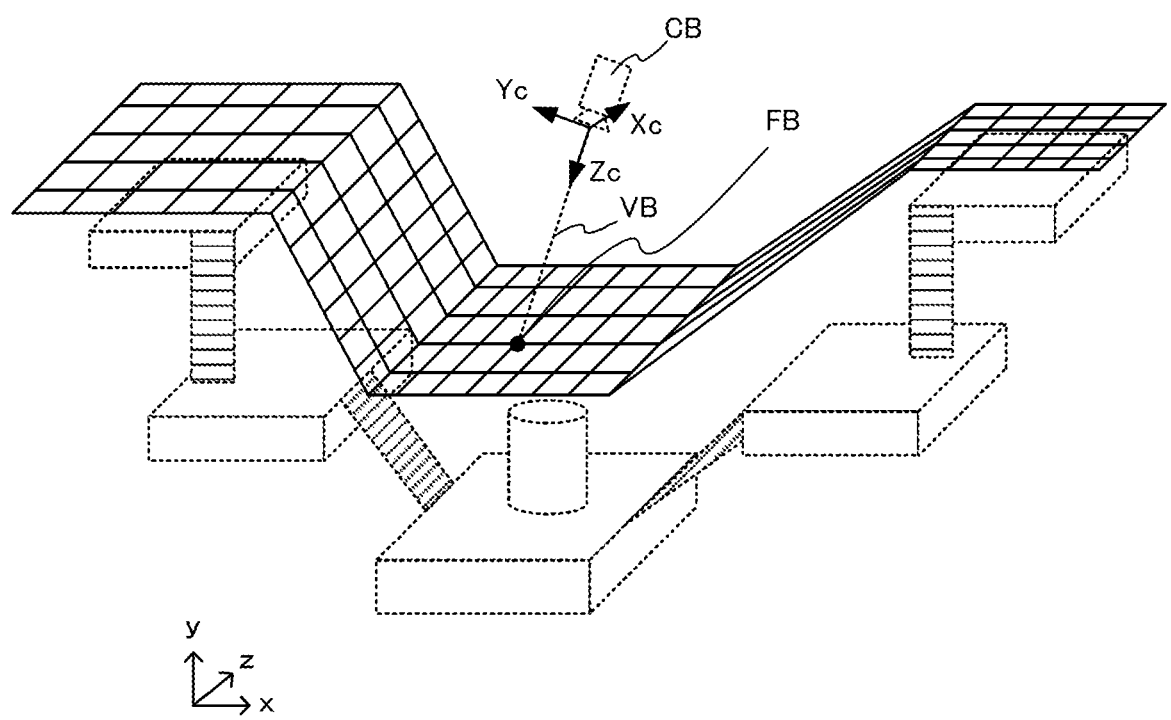

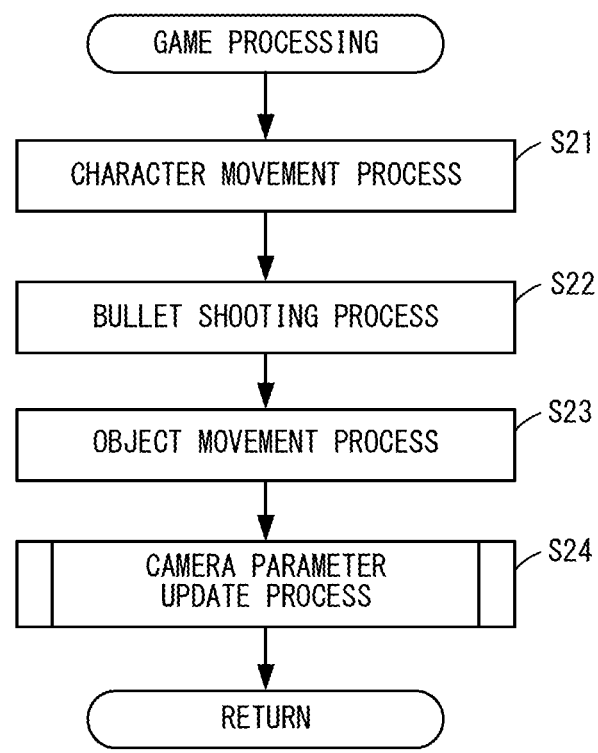
F I G. 2 4

F I G. 25
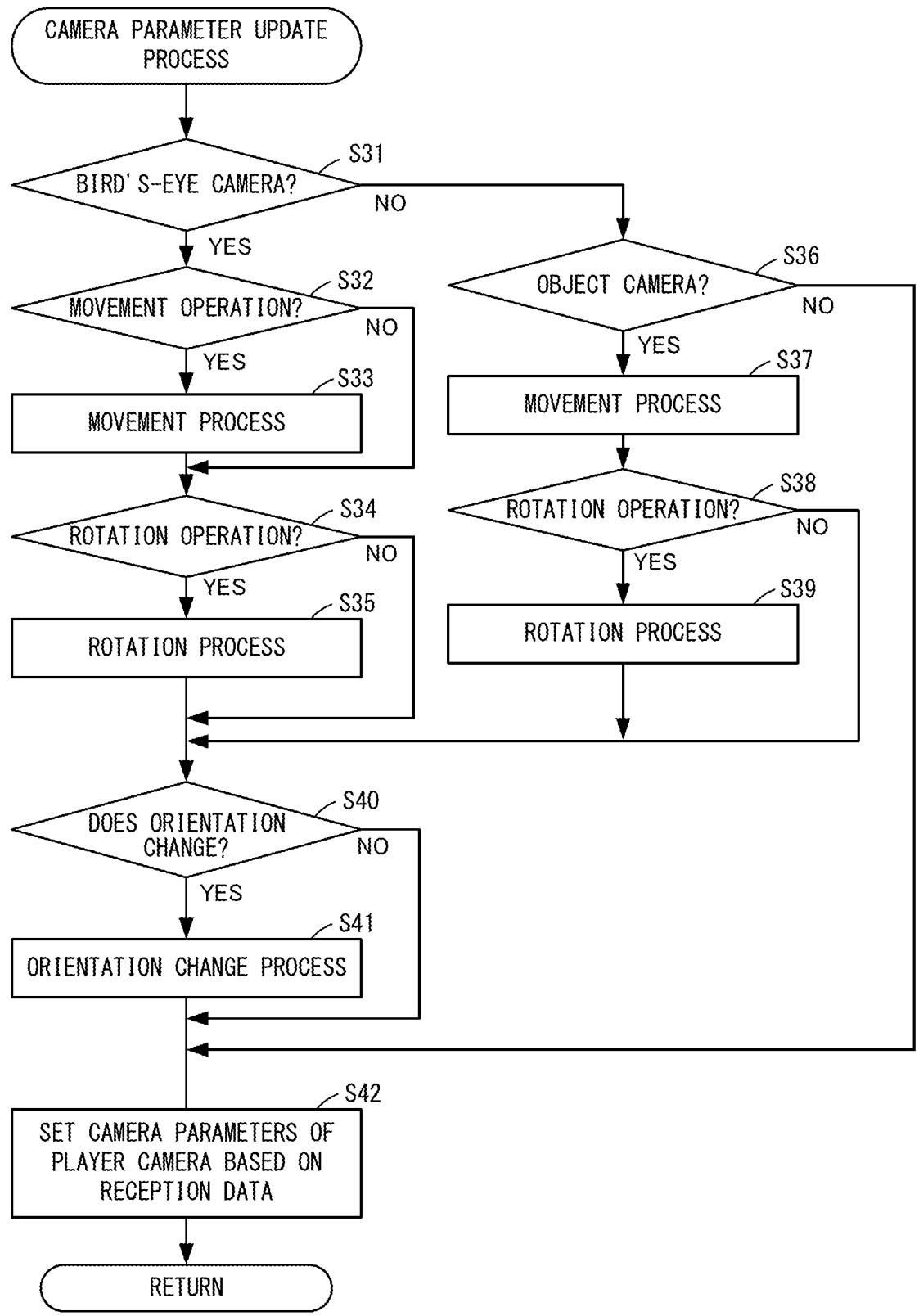

NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

CROSS REFERENCE TO RELATED APPLICATION

The disclosure of Japanese Patent Application No. 2017-96371, filed on May 15, 2017, is incorporated herein by reference.

FIELD

An exemplary embodiment relates to a non-transitory storage medium having stored therein an information processing program, an information processing system, an information processing apparatus, and an information processing method.

BACKGROUND AND SUMMARY

Conventionally, there is a game system where a plurality of players execute an online game using a network. In such a game system, a watcher can connect to the game system and watch an online game executed by a plurality of players.

In the conventional game system, however, there is room for improvement in providing an image easy for the watcher watching the game to view.

Therefore, it is an object of an exemplary embodiment to provide an information processing program, an information processing system, an information processing apparatus, and an information processing method that are capable of providing an image easy for a viewer viewing a game to view, and of also allowing viewing with a high degree of freedom.

To achieve the above object, the exemplary embodiment employs the following configurations.

A non-transitory storage medium having stored therein an information processing program according to the exemplary embodiment is a non-transitory storage medium having stored therein an information processing program executed by a computer of an information processing apparatus. The information processing program causes the computer to execute a play data acquisition step, an object control step, a mode switching step, a first camera control step, a second camera control step, a during-switching camera control step, and a game image generation step. In the play data acquisition step, play data generated based on an operation performed by another player on another information processing apparatus while a multiplay game is executed is acquired. In the object control step, in a virtual space where the multiplay game is performed and based on the acquired play data, a position of at least one object including a player character operated by the other player is updated. In the mode switching step, based on an instruction from an operator, a mode regarding a virtual camera in the virtual space is switched to a first mode and a second mode. In the first camera control step, in the first mode and based on a movement operation of the operator, the virtual camera is moved so that a height of the virtual camera is a height set in advance in accordance with a position specified based on the movement operation. In the second camera control step, in the second mode and based on the acquired play data, the virtual camera is moved by following a specified object. In the during-switching camera control step, when the mode is switched in the mode switching step, the virtual camera is moved from a position of the virtual camera in the mode before the switching to a position of the virtual camera in the mode after the switching, and a direction of the virtual camera during the movement is also calculated and updated. In the game image generation step, based on the virtual camera, a game image of the virtual space is generated.

Based on the above, in a first mode, a virtual camera is set to a height determined in advance in accordance with a position. Thus, an operator does not need to adjust the height, and a game image appropriate for the operator can be generated by a simple operation. Further, when the mode of the virtual camera is switched, the direction of the virtual camera during movement is calculated, and the state where the virtual camera moves from a position before the switching to a position after the switching is displayed. Thus, when switching the virtual camera, the operator can easily understand from which position to which position in a virtual space the virtual camera moves.

Further, the specified object may be the player character operated by the other player.

Based on the above, it is possible to switch a first mode where the virtual camera can be moved based on a movement operation of the operator, and a second mode where the virtual camera follows a player character operated by another player.

Further, a height map including at least one surface may be set in the virtual space. The information processing program may cause the computer to, in the first camera control step, based on the movement operation, move a gaze point or a viewpoint of the virtual camera on the surface of the height map.

Based on the above, based on a height map set in the virtual space, it is possible to move a gaze point or a viewpoint of the virtual camera. For example, when the height map is set at a position higher than that of an object in the virtual space, it is possible to prevent the virtual camera from coming into contact with the object in the virtual space in the process of moving the virtual camera in the first mode.

Further, the information processing program may cause the computer to, in the first camera control step, based on the movement operation, move the gaze point of the virtual camera on the surface of the height map and determine as the viewpoint of the virtual camera a position a certain distance away from the gaze point in a certain direction.

Based on the above, the gaze point of the virtual camera is moved on the height map, whereby it is possible to move the virtual camera. Since the gaze point is moved, it is possible to make it easy for the operator to move the virtual camera in accordance with an object to which the operator wishes to pay attention.

Further, the information processing program may further cause the computer to execute an orientation control step of, based on an operation of the operator, changing an orientation of the virtual camera at the determined viewpoint of the virtual camera.

Based on the above, it is possible to move the gaze point on the height map, set the viewpoint based on the gaze point, and change the orientation (the direction) of the virtual camera at the viewpoint set based on the gaze point.

Further, in the mode switching step, based on an instruction from the operator, the mode regarding the virtual camera may be further switched to a third mode. The information processing program may further cause the computer to execute a third camera control step of, in the third mode, moving the virtual camera by following an object other than the player character.

Based on the above, it is possible to move the virtual camera by following the object other than a player character, and it is possible to pay attention to the object. Consequently, for example, the operator can always view an important object in a game.

Further, in the mode switching step, based on an instruction from the operator, the mode regarding the virtual camera may be further switched to a fourth mode. The information processing program may further cause the computer to execute a fourth camera setting step of, in the fourth mode, setting the virtual camera at a certain position in the virtual space.

Based on the above, it is possible to further set the virtual camera at the certain position in the virtual space. For example, the operator can fix the virtual camera at a position where a wide range in the virtual space is overlooked, and can view a wide range in the virtual space.

Further, in the other information processing apparatus, based on an operation of the other player, the player character corresponding to the other player and a position and a direction of the virtual camera corresponding to the player character may be controlled, and a game image based on the virtual camera may be generated. The information processing program may cause the computer to, in the second camera control step, based on the play data, control the virtual camera so that the position and the direction of the virtual camera are the same as a position and a direction of a virtual camera controlled by the other information processing apparatus in which the specified player character is operated.

Based on the above, the operator of the information processing apparatus can view a game image viewed in another information processing apparatus by another player.

Further, the play data acquired in the play data acquisition step may at least include the position of the player character and the direction of the virtual camera corresponding to the player character.

Based on the above, it is possible to receive the position of a player character and the direction of the virtual camera as play data, and based on the received play data, set the direction of the virtual camera.

Further, the multiplay game may be a game where based on an instruction from a player, shooting is performed in a direction corresponding to the direction of the virtual camera corresponding to the player character.

Based on the above, it is possible to execute a game where shooting is performed in a direction corresponding to the direction of the virtual camera, and the operator can view the game.

Further, another example of the exemplary embodiment is an information processing system, including a plurality of information processing apparatuses, for executing a multiplay game. The information processing system includes a play data generation section, an object control section, a first display control section, a mode switching section, a first camera control section, a second camera control section, a during-switching camera control section, and a second display control section. The play data generation section generates play data based on an operation performed by a player on a first information processing apparatus among the plurality of information processing apparatuses. The object control section, in a virtual space where the multiplay game is performed and based on the play data, updates a position of at least one object including a player character operated by the player. The first display control section, based on the play data, controls a first virtual camera in the virtual space, and based on the first virtual camera, generates a game image of the virtual space, and display the generated game image on a display device of the first information processing apparatus. The mode switching section, based on an instruction from an operator of a second information processing apparatus among the plurality of information processing apparatuses, switches a mode regarding a second virtual camera in the virtual space to a first mode and a second mode. The first camera control section, in the first mode and based on a movement operation of the operator of the second information processing apparatus, moves the second virtual camera so that a height of the second virtual camera is a height set in advance in accordance with a position specified based on the movement operation. The second camera control section, in the second mode and based on the play data, moves the second virtual camera by following a specified object. The during-switching camera control section, when the mode is switched by the mode switching section, moves the second virtual camera from a position of the second virtual camera in the mode before the switching to a position of the second virtual camera in the mode after the switching, and calculates and updates a direction of the second virtual camera during the movement. The second display control section generates a game image of the virtual space based on the second virtual camera and display the generated game image on a display device of the second information processing apparatus.

Further, yet another exemplary embodiment may be an information processing apparatus for executing the information processing program. Further, yet another exemplary embodiment may be an information processing method performed by the information processing system.

According to the exemplary embodiment, a virtual camera is set at a height determined in advance. Thus, an operator can view a virtual space from an appropriate viewpoint by a simple operation.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is an example non-limiting diagram showing an overview of a game system according to an exemplary embodiment;

FIG. 6 is an example non-limiting diagram showing the position of the bird's-eye camera CB when a gaze point FB moves in the directions of arrows shown in FIG. 5;

FIG. 11 is an example non-limiting diagram showing a camera coordinate system of the bird's-eye camera CB in a case where the orientation of the bird's-eye camera CB is not changed;

FIG. 24 is an example non-limiting flow chart showing the details of game processing in step S12 in FIG. 23;

FIG. 25 is an example non-limiting flow chart showing the details of a camera parameter update process in step S24 in FIG. 24;

DETAILED DESCRIPTION OF NON-LIMITING EXAMPLE EMBODIMENTS

An information processing system according to an example of an exemplary embodiment is described below. An example of an information processing system 1 according to the exemplary embodiment is a game system including a plurality of game apparatuses (examples of an information processing apparatus). FIG. 1 is a diagram showing an overview of the game system according to the exemplary embodiment.

As shown in FIG. 1, a plurality of game apparatuses 10 (10a to 10f) are connected to a network. The plurality of game apparatuses 10 are connected to, for example, the Internet and can execute a network game in which a plurality of players participate. For example, the plurality of game apparatuses 10 communicate with a server on the Internet, thereby executing a competition-type game. The server may include a single server apparatus or a plurality of server apparatuses.

Figure 2:
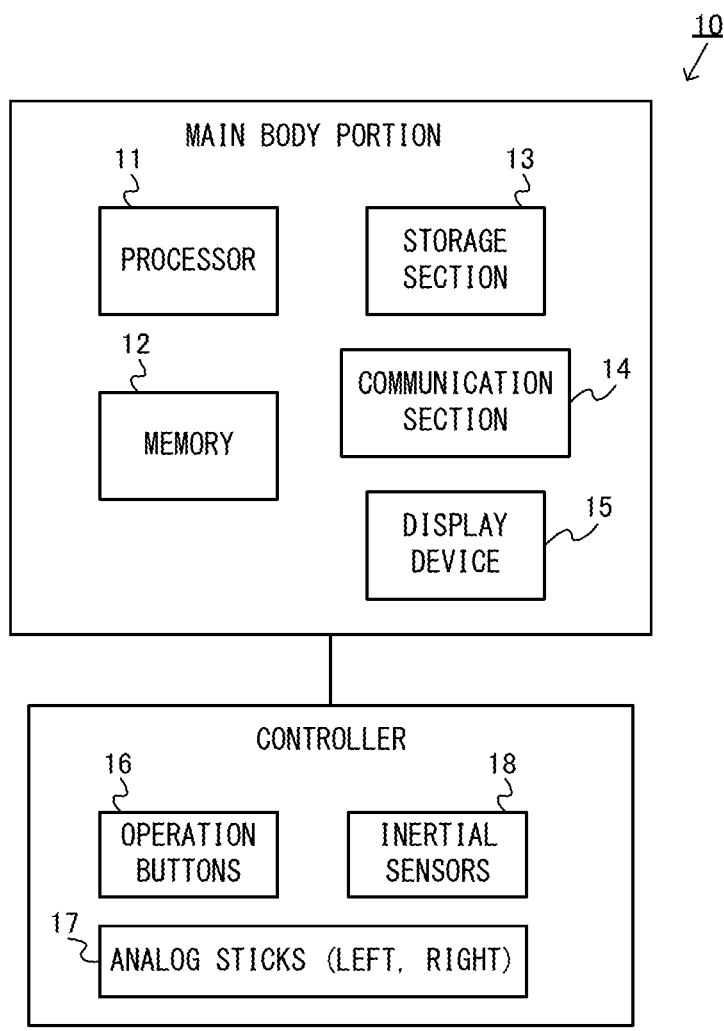
FIG. 2 is an example non-limiting diagram showing an example of the configuration of a game apparatus 10.

FIG. 2 is a diagram showing an example of the configuration of each game apparatus 10. As shown in FIG. 2, the game apparatus 10 includes a main body portion and a controller. The main body portion includes a processor 11, a memory 12, a storage section 13, a communication section 14, and a display device 15. The processor 11 is connected to the memory 12, the storage section 13, the communication section 14, and the display device 15. Using an information processing program and various types of data temporarily stored in the memory 12, the processor 11 performs information processing shown in flow charts described later. The storage section 13 is a non-transitory storage medium for storing the information processing program and various types of data and is, for example, a non-volatile memory, an optical storage medium, a hard disk, or the like. The storage section 13 may be detachably connectable to the main body portion, or may be fixed within the main body portion. The communication section 14 connects to the network (e.g., the Internet or a LAN) and communicates with another apparatus. The communication section 14 may perform communication compliant with, for example, a wireless LAN standard. The display device 15 is, for example, a display device unified with the main body portion and displays a game image described later. As the display device 15, a liquid crystal display device, an organic EL display device, or the like may be used. Further, a touch panel may be provided on a screen of the display device 15. It should be noted that the game apparatus 10 can connect to another display device (e.g., a television) different from the display device 15 and may be able to output a game image to the other display device and/or the display device 15.

The controller includes a plurality of operation buttons 16, which can be pressed, analog sticks 17, with which a direction can be indicated, and inertial sensors 18, which detect the orientation of the controller. The analog sticks 17 include a left analog stick that is operated with the left hand of a user, and a right analog stick that is operated with the right hand of the user. The inertial sensors 18 include an acceleration sensor and an angular velocity sensor. Based on detection data from the inertial sensors 18 of the controller, the processor 11 of the main body portion calculates the accelerations and the angular velocities of the controller and thereby can calculate the orientation of the controller in real space. It should be noted that the orientation of the controller may be calculated based not only on an inertial sensor but also on, for example, an image captured by a real camera.

It should be noted that the main body portion and the controller of the game apparatus 10 may be configured in a unified manner or may be separate from each other. Further, the controller may be detachably connected to the main body portion. In a case where the main body portion and the controller are separate from each other, the main body portion and the controller may be connected together in a wireless or wired manner and communicate with each other.

Further, the game apparatus 10 may be a mobile game apparatus obtained by unifying the main body portion, the controller, and the display device 15, or may be a stationary game apparatus obtained by separating at least some of these components. Further, the game apparatus 10 may function as a mobile game apparatus and also function as a stationary game apparatus.

Referring back to FIG. 1, a game according to the exemplary embodiment is a competition-type game where each player belongs to a team A or a team B, and the team A and the team B compete against each other. For example, as shown in FIG. 1, a player of the game apparatus 10a and a player of the game apparatus 10b belong to the team A, and a player of the game apparatus 10c and a player of the game apparatus 10d belong to the team B. Further, a user of the game apparatus 10e and a user of the game apparatus 10f watch the competition game performed between the team A and the team B, without belonging to either of the team A and the team B.

It should be noted that hereinafter, a user of a game apparatus 10 who plays the game by belonging to the team A or the team B will be referred to as a "player", and a user of a game apparatus 10 who only watches the game without belong to either of the team A and the team B will be referred to as a "watcher". Further, a game apparatus 10 owned by a "player" will be referred to as a "player terminal", and a game apparatus 10 owned by a "watcher" will be referred to as a "watcher terminal".

In the exemplary embodiment, four players (four game apparatuses 10) can belong to the team A, and also four players (four game apparatuses 10) can belong to the team B. Further, the maximum number of watchers is two. It should be noted that the number of players capable of belonging to each team may be less than four, or may be five or more. Further, the number of watchers may be only one, or may be three or more.

A description is given below of a case where the competition game is performed between the team A to which the player of the game apparatus 10a and the player of the game apparatus 10b belong, and the team B to which the player of the game apparatus 10c and the player of the game apparatus 10d belong, and a single watcher watches the competition game.

Figure 3:
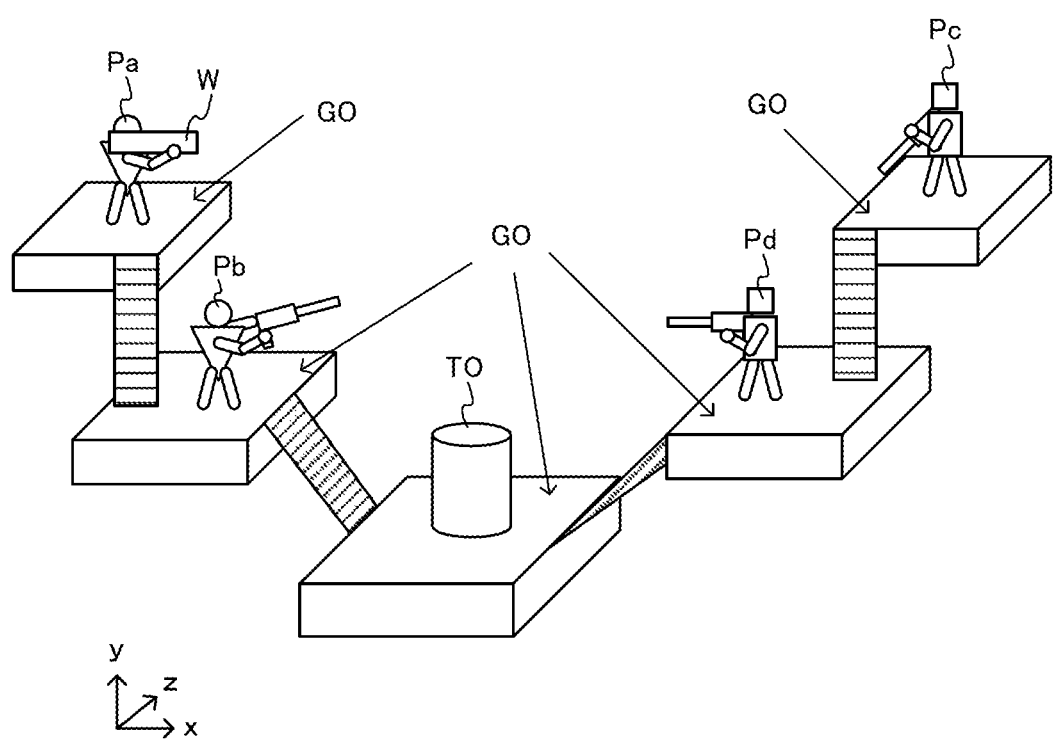
FIG. 3 is an example non-limiting diagram showing an example of a virtual space where a competition game according to the exemplary embodiment is performed.

FIG. 3 is a diagram showing an example of a virtual space where the competition game according to the exemplary embodiment is performed. The virtual space is defined by an xyz coordinate system (a global coordinate system) including an x-axis, a y-axis, and a z-axis orthogonal to each other. The x-axis is an axis fixed in the virtual space and is also an axis in a crosswise direction in the virtual space. The y-axis is an axis fixed in the virtual space and is also an axis in a height direction in the virtual space. The z-axis is an axis fixed in the virtual space and is also an axis in a lengthwise direction (a depth direction in FIG. 3) in the virtual space.

As shown in FIG. 3, the virtual space includes a plurality of geographical objects GO, which represent geography, player characters P (Pa to Pd), which perform actions in accordance with operations of respective players, and a moving object TO.

The player character Pa is a player character operated by the player of the game apparatus 10a. The player character Pb is a player character operated by the player of the game apparatus 10b. The player character Pc is a player character operated by the player of the game apparatus 10c. The player character Pd is a player character operated by the player of the game apparatus 10d.

Each geographical object GO is a surface (a planar surface or a curved surface) parallel to or forming a predetermined angle with an xz plane. The geographical objects GO are objects fixed in the virtual space, and the heights in the virtual space of the geographical objects GO are different from each other. The plurality of player characters P and the moving object TO can move on the geographical objects GO. Thus, in the game according to the exemplary embodiment, the plurality of player characters P and the moving object TO can move in a space expanded in the height direction in the virtual space.

Initially, the player characters Pa and Pb on the team A are located in the territory of the team A, and the player characters Pc and Pd on the team B are located in the territory of the team B. Further, initially, the moving object TO is located midway between the territory of the team A and the territory of the team B.

In accordance with an operation on the controller of the game apparatus 10 to which each player character P corresponds, the player character P moves in the virtual space, jumps, or shoots liquid (a bullet). For example, in accordance with an operation on the left analog stick of the controller, each player character P moves in the virtual space. Further, each player character P has various equipages and has a weapon W as one of the equipages. Each player character P shoots liquid (a bullet) using the weapon W, thereby painting over the geographical objects GO in the virtual space. In an area painted over by a player character P on a certain team, the motion of a player character on the opposing team slows down. Further, each player character P shoots liquid (a bullet) using the weapon W and thereby can attack a player character P on the opposing team.

The moving object TO is an object capable of moving in the virtual space. If any of the player characters P gets on the moving object TO, the moving object TO automatically moves in accordance with a path determined in advance in the virtual space. For example, if the player character Pa belonging to the team A gets on the moving object TO, the moving object TO moves toward the territory of the team B. In the exemplary embodiment, a team having moved the moving object TO to the territory of the opposing team wins. Thus, the moving object TO is an important object that affects the outcome of the game according to the exemplary embodiment.

Figure 4:
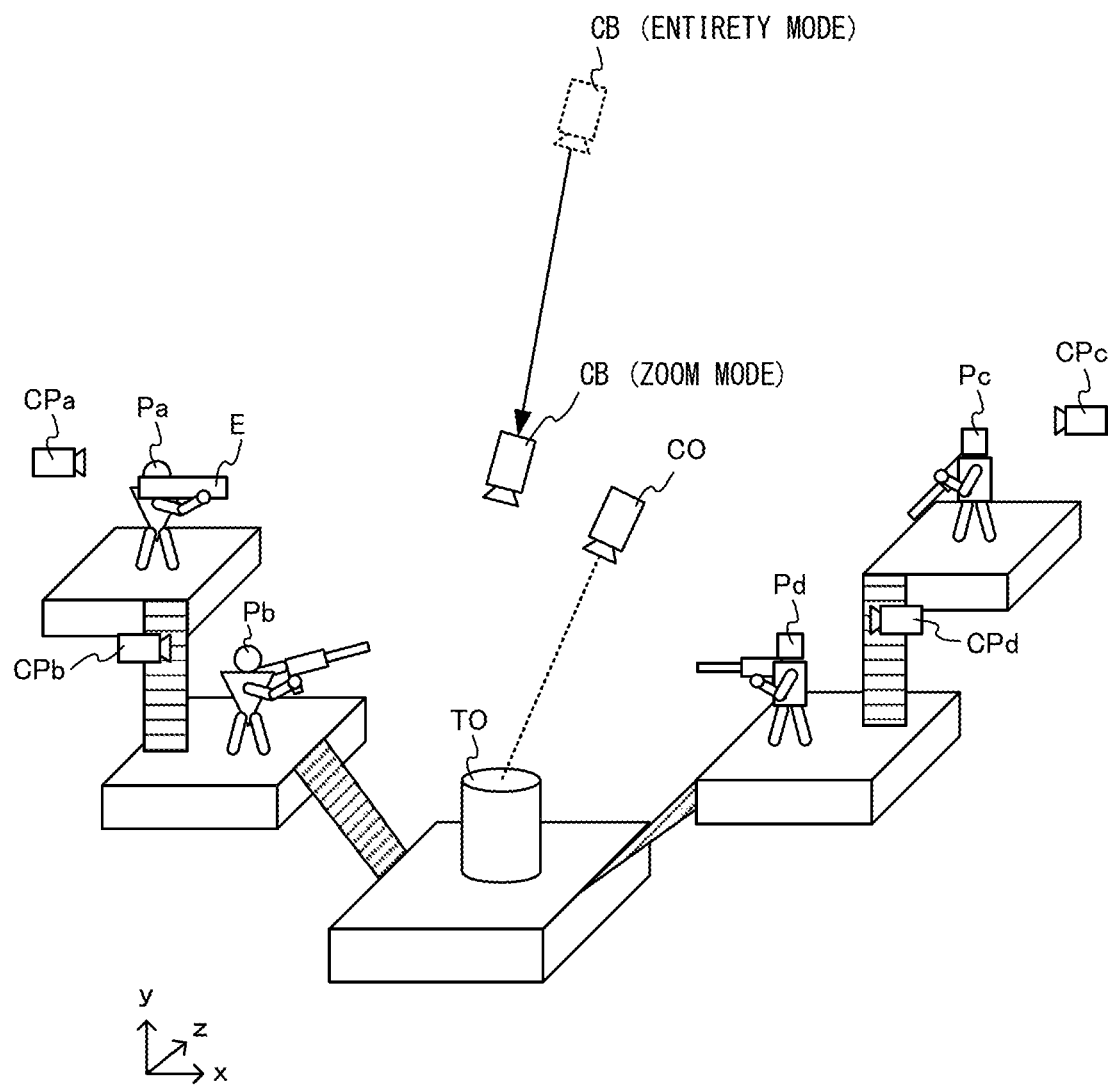
FIG. 4 is an example non-limiting diagram showing examples of virtual cameras placed in the virtual space.

FIG. 4 is a diagram showing examples of virtual cameras placed in the virtual space. As shown in FIG. 4, in the virtual space, fixed player cameras CP (CPa to CPd) are placed for the respective player characters P.

The player camera CPa is a virtual camera fixed to the player character Pa and moves following the player character Pa. The player camera CPb is a virtual camera fixed to the player character Pb and moves following the player character Pb. The player camera CPc is a virtual camera fixed to the player character Pc and moves following the player character Pc. The player camera CPd is a virtual camera fixed to the player character Pd and moves following the player character Pd.

Initially, each player camera CP is placed at a predetermined position behind the player character P. The gaze point of each player camera CP is set to a predetermined position over the head of the player character P. It should be noted that each player operates, for example, the right analog stick of the controller of the game apparatus 10, whereby the player camera CP can rotate about the player character P.

Each player performs the game while viewing an image of the virtual space viewed from the player camera CP fixed to the player character P and performs shooting in a direction corresponding to the direction of the player camera CP. For example, while viewing an image of the virtual space viewed from the player camera CPa, the player of the game apparatus 10a moves the player character Pa or causes the player character Pa to shoot liquid (a bullet) in a direction corresponding to the direction of the player camera CPa. Similarly, while viewing images of the virtual space viewed from the respective player cameras CP, the players of the other game apparatuses 10 each move the player character P corresponding to the players themselves or cause the player character P to shoot a bullet.

Further, in the virtual space, an object camera CO is placed. The object camera CO is a virtual camera that follows the moving object TO. The object camera CO is located at a position a predetermined distance away from the position of the moving object TO. The gaze point of the object camera CO is set to the position of the moving object TO. Further, although the details will be described later, in accordance with an operation on the controller of the watcher terminal, the object camera CO rotates about the moving object TO.

Further, in the virtual space, a bird's-eye camera CB is placed. The bird's-eye camera CB is a virtual camera that views the virtual space from a bird's-eye view (from above). The bird's-eye camera CB operates in either of an "entirety mode" where the entirety of the virtual space is overlooked, and a "zoom mode" where a part of the virtual space is enlarged. When the bird's-eye camera CB is in the entirety mode, the position and the orientation of the bird's-eye camera CB are fixed. On the other hand, when the bird's-eye camera CB is in the zoom mode, the bird's-eye camera CB moves or rotates in the virtual space in accordance with an operation on the controller of the watcher terminal.

The bird's-eye camera CB and the object camera CO are defined only in the watcher terminal. When there are two watcher terminals, the bird's-eye camera CB and the object camera CO are defined in each watcher terminal.

Using either of the bird's-eye camera CB, the player cameras CP, and the object camera CO, the watcher can watch the game performed in the virtual space and switch the plurality of virtual cameras in accordance with an operation. That is, the watcher can switch a first mode (the bird's-eye camera CB in the zoom mode), a second mode (each player camera CP), a third mode (the object camera CO), and a fourth mode (the bird's-eye camera CB in the entirety mode) regarding the virtual cameras for the watcher.

On the other hand, the bird's-eye camera CB and the object camera CO are not defined in each player terminal. Thus, an image of the virtual space viewed from the object camera CO or the bird's-eye camera CB is not displayed on the display device of each player terminal.

(Camera Parameters)

In the exemplary embodiment, the position and the orientation (the direction) of each virtual camera are determined by camera parameters. The camera parameters include the following three types of parameters.

A gaze point F

A vector V (hereinafter referred to as an "arm vector V") from the gaze point F to the position of the virtual camera Orientation information (a pitch angle Gα and a yaw angle Gβ in the xyz coordinate system described later) of the virtual camera It should be noted that although the details will be described later, when the orientation of the virtual camera is not changed (when a pitch angle α and a yaw angle β in a camera coordinate system described later are 0), the gaze point F as a camera parameter of the virtual camera coincides with the center of the screen of the display device. On the other hand, when the orientation of the virtual camera is changed, the gaze point F as a camera parameter of the virtual camera does not necessarily coincide with the center of the screen of the display device.

Hereinafter, the orientation of the virtual camera when the orientation of the virtual camera is not changed will be referred to as a "reference orientation". Further, the gaze point as a camera parameter of the virtual camera will be referred to as a "gaze point F" so as to distinguish this gaze point from a gaze point meaning the center of the actual screen. Specifically, the gaze point as a camera parameter of the bird's-eye camera CB will be referred to as a "gaze point FB". The gaze point as a camera parameter of the object camera CO will be referred to as a "gaze point FO". The gaze point as a camera parameter of the player camera CP will be referred to as a "gaze point FP".

A description is given below of the movement and the rotation of the bird's-eye camera CB in the zoom mode.

(Movement and Rotation of Bird's-Eye Camera)

Figure 5:
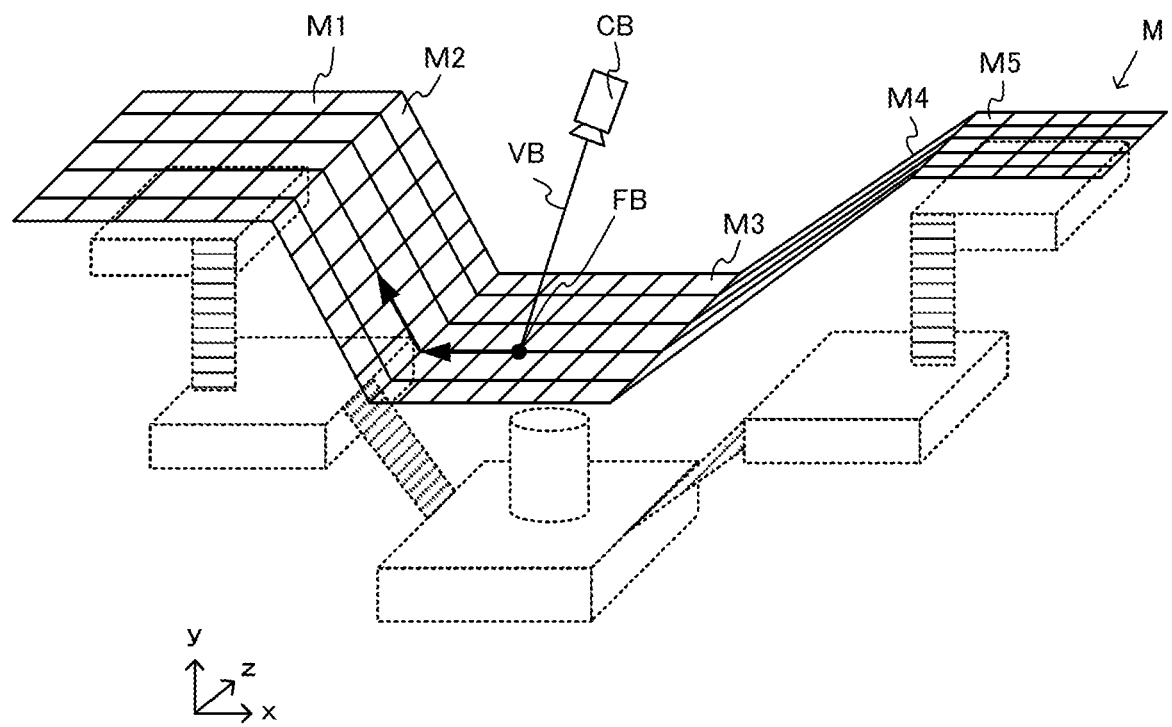
FIG. 5 is an example non-limiting diagram illustrating the movement of a bird's-eye camera CB in a zoom mode.

FIG. 5 is a diagram illustrating the movement of the bird's-eye camera CB in the zoom mode. As shown in FIG. 5, in the virtual space, a height map M for controlling the movement of the bird's-eye camera CB is set. The height map M is a map for setting the height in the virtual space of the bird's-eye camera CB and includes a plurality of control surfaces M1 to M5. The control surfaces M1 to M5 are virtual surfaces set in advance in the virtual space and are, for example, planar surfaces. Alternatively, the control surfaces M1 to M5 may be curved surfaces. It should be noted that the control surfaces M1 to M5 are not displayed on the display device of each game apparatus 10 during the game.

The shape and the position of the height map M are set so that the height map M does not come into contact with the geographical objects GO. For example, the control surfaces M1 to M5 are placed parallel to each geographical object GO and set above (at a position further in a positive y-axis direction than) the geographical object GO in the virtual space. The gaze point FB of the bird's-eye camera CB moves on the control surfaces M1 to M5. Specifically, if the watcher operates the left analog stick of the controller of the game apparatus 10, then in accordance with the direction of the operation, the gaze point FB of the bird's-eye camera CB moves on the control surfaces M1 to M5.

The bird's-eye camera CB is placed at a position above the gaze point FB in the virtual space. Specifically, the bird's-eye camera CB is located on a straight line passing through the gaze point FB and forming a predetermined angle with the xz plane in the xyz coordinate system. Further, the bird's-eye camera CB is placed at a position a predetermined distance away from the gaze point FB. Specifically, in the xyz coordinate system, an arm vector VB is defined, which forms a predetermined angle with the xz plane and has a predetermined length. Then, a position obtained by adding the arm vector VB to the position vector of the gaze point FB is defined as the position of the bird's-eye camera CB in the xyz coordinate system.

It should be noted that in the exemplary embodiment, the length of the arm vector VB is fixed. Alternatively, the length of the arm vector VB may be variable in accordance with an operation of the watcher. That is, the bird's-eye camera CB in the zoom mode may be able to zoom in or zoom out.

Figure 7:
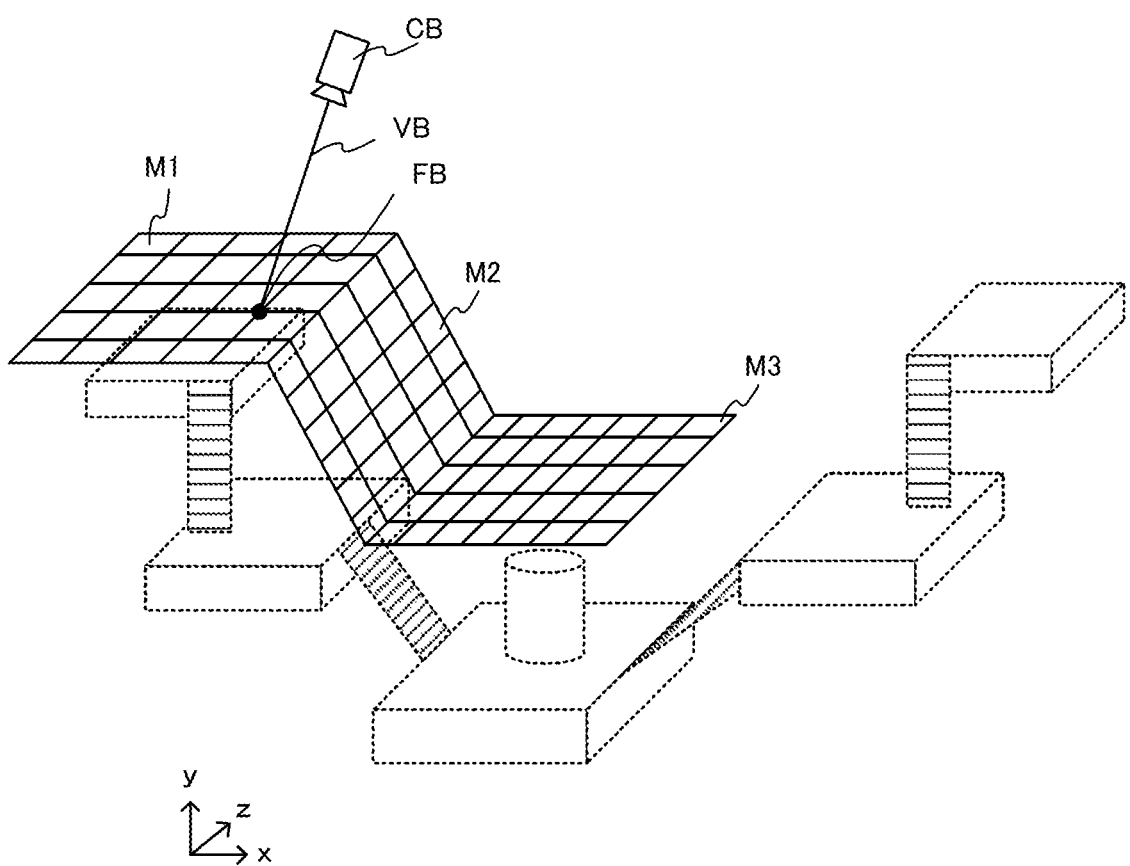
FIG. 7 is an example non-limiting diagram showing the position of the bird's-eye camera CB when the gaze point FB further moves the directions of arrows shown in FIG. 6.

FIG. 6 is a diagram showing the position of the bird's-eye camera CB after the gaze point FB moves in the directions of arrows shown in FIG. 5. FIG. 7 is a diagram showing the position of the bird's-eye camera CB after the gaze point FB further moves in the directions of arrows shown in FIG. 6. It should be noted that although the control surface M4 and the control surface M5 are not shown in FIGS. 6 and 7, actually, the control surface M4 and the control surface M5 are also set in the virtual space.

As shown in FIGS. 6 and 7, when the gaze point FB of the bird's-eye camera CB moves, the position (i.e., the viewpoint) of the bird's-eye camera CB also moves. The gaze point FB of the bird's-eye camera CB moves on the control surfaces, and the position of the bird's-eye camera CB is located above the control surfaces in the virtual space. Thus, in the process in which the bird's-eye camera CB moves, the bird's-eye camera CB does not come into contact with the geographical objects GO.

Further, basically, each player character P moves on the geographical objects GO. Further, the player character P may jump. At this time, the player character P may not be located on the geographical objects GO by jumping, but does not jump to the position of the bird's-eye camera CB. Further, the moving object TO moves on the geographical objects GO. Thus, in the process in which the bird's-eye camera CB moves, the bird's-eye camera CB does not come into contact with the player character P or the moving object TO.

Figure 8:
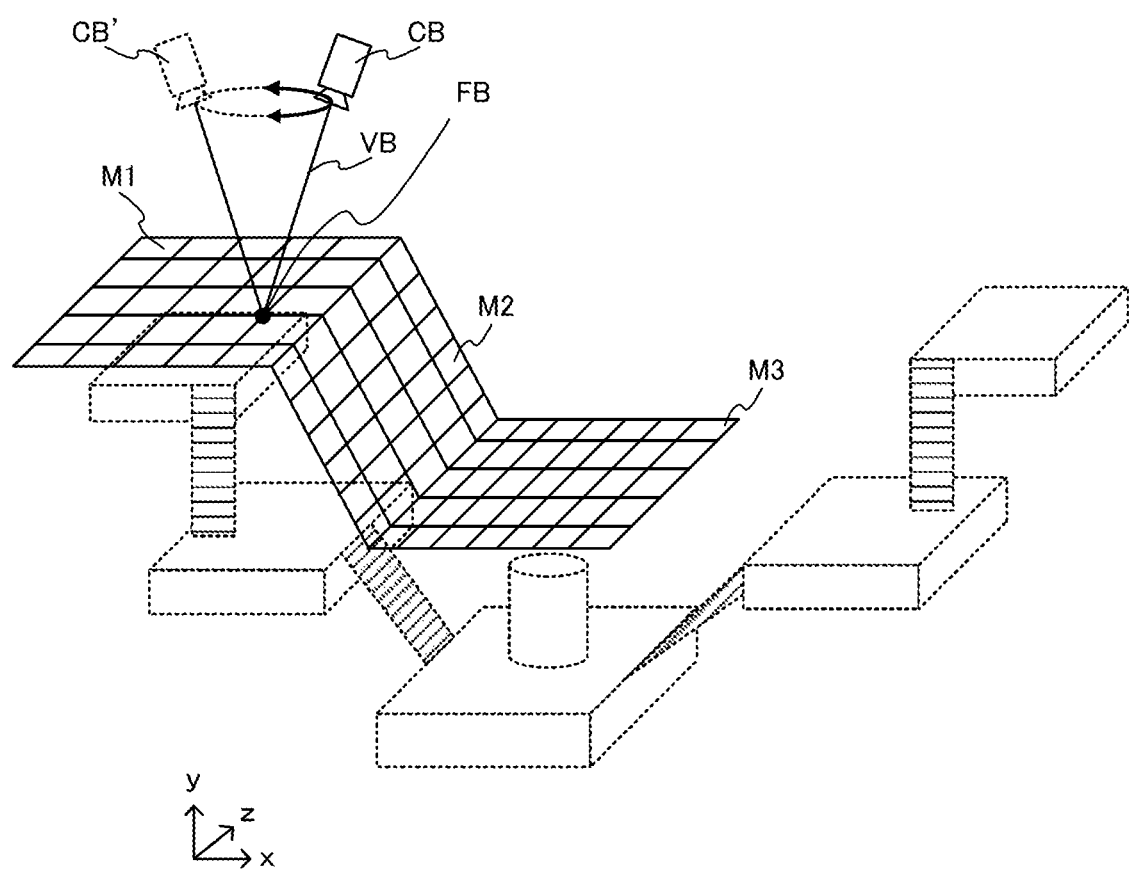
FIG. 8 is an example non-limiting diagram illustrating the rotation of the bird's-eye camera CB in the zoom mode.

Next, the rotation of the bird's-eye camera CB is described. FIG. 8 is a diagram illustrating the rotation of the bird's-eye camera CB in the zoom mode.

As shown in FIG. 8, in accordance with an operation performed by the watcher on the right analog stick of the controller of the game apparatus 10, the bird's-eye camera CB can rotate about the gaze point FB on the control surfaces. The position of the bird's-eye camera CB changes so that a line segment connecting the position of the bird's-eye camera CB and the gaze point FB draws a conical plane. For example, the arm vector VB in the virtual space is rotated about a straight line passing through the gaze point FB and parallel to the y-axis, thereby rotating the bird's-eye camera CB.

As described above, in the exemplary embodiment, in accordance with an operation of the watcher, the bird's-eye camera CB can be moved in the virtual space. Specifically, based on a movement operation of the watcher, a virtual camera moves so that the height in the virtual space of the virtual camera is a height set in advance in accordance with a position specified (to change) based on the movement operation. More specifically, the height of the bird's-eye camera CB is set based on a height map including a plurality of control surfaces. In accordance with a movement operation of the watcher, the gaze point FB of the bird's-eye camera CB moves on the control surfaces, and the position (the viewpoint) of the bird's-eye camera CB is set at a position a predetermined distance away from the gaze point FB in a predetermined direction in the virtual space (a direction having a component in the positive y-axis direction).

It should be noted that in the exemplary embodiment, the gaze point FB of the bird's-eye camera CB is moved on control surfaces, and the viewpoint of the bird's-eye camera CB is set at a position a predetermined distance away from the gaze point FB in a predetermined direction. In another exemplary embodiment, control surfaces may be set in the virtual space, and the viewpoint of the bird's-eye camera CB may be moved on the control surfaces. In this case, the control surfaces are set at positions higher than those of the geographical objects GO in the virtual space. For example, in order not to come into contact with any object in the virtual space, the control surfaces are set at positions higher than those of the geographical objects GO and objects (the player characters P, the moving object TO, and the like) located on the geographical objects GO. For example, the control surfaces are set at positions that cannot be reached even by the player character P jumping. When the viewpoint of the bird's-eye camera CB is moved on such control surfaces, it is possible to prevent the bird's-eye camera CB from coming into contact with an object in the virtual space during the movement of the bird's-eye camera CB.

In the exemplary embodiment, the watcher (an operator) can move the bird's-eye camera CB and therefore can watch the game with a high degree of freedom. Based on a movement operation of the watcher, the height of the bird's-eye camera CB is determined in advance in accordance with a position (the gaze point or the viewpoint of the bird's-eye camera) specified based on the movement operation. Thus, the watcher does not need to adjust the height of the bird's-eye camera CB. Thus, the watcher only performs a relatively simple operation for tilting (or sliding) an analog stick in a predetermined direction, and thereby can move the bird's-eye camera CB in a left-right direction or a depth direction in the virtual space and also move the bird's-eye camera CB to an appropriate height. Thus, the watcher can watch the game from an appropriate angle. Since the height map M for setting the height of the bird's-eye camera CB is placed above the geographical objects GO in the virtual space, it is possible to prevent the bird's-eye camera CB from coming into contact with or coming too close to the geographical objects GO during the movement of the bird's-eye camera CB.

Further, to prevent the bird's-eye camera CB from coming into contact with the geographical objects GO, for example, it may be possible to perform an exceptional process for avoiding contact between the bird's-eye camera CB and the geographical objects GO during the movement of the bird's-eye camera CB. For example, it may be possible to perform the process of, when the bird's-eye camera CB comes into contact with the geographical objects GO, changing the movement path of the bird's-eye camera CB. To perform the process of avoiding such contact, it is necessary to determine contact between the bird's-eye camera CB and the geographical objects GO. Thus, the process may become complex. In the exemplary embodiment, however, a height map is set in advance. Thus, it is not necessary to perform such a complex process during the movement of the bird's-eye camera CB.

(Movement and Rotation of Object Camera)

Figure 9:
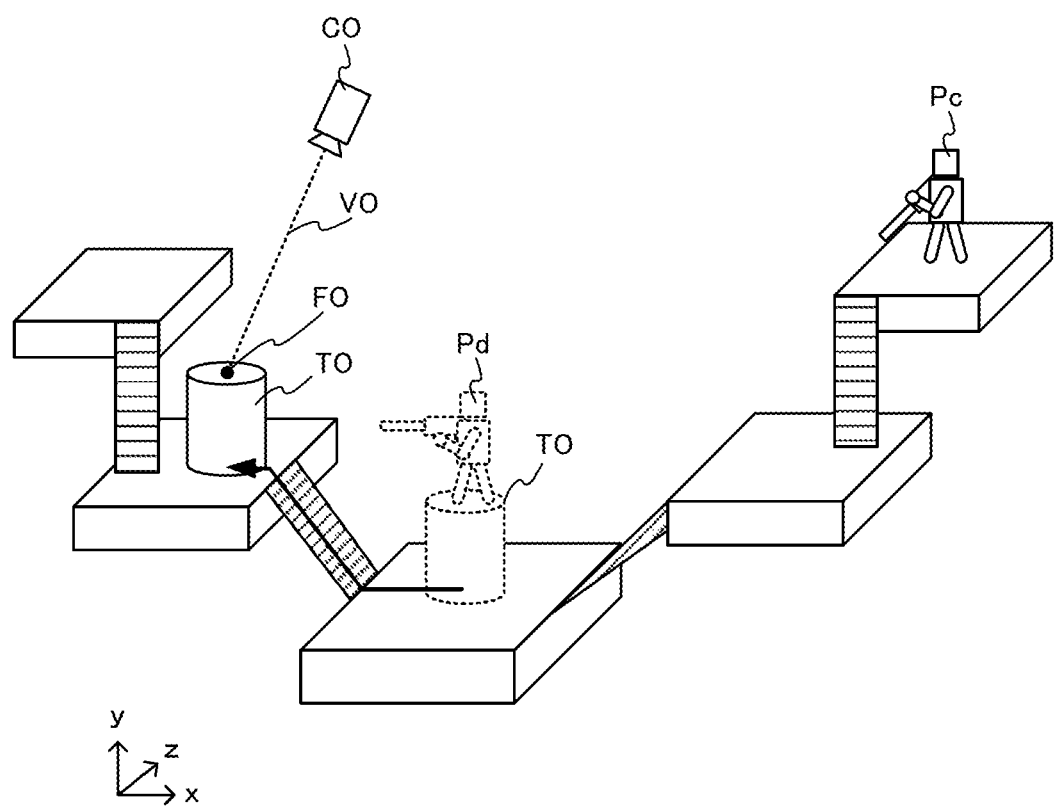
FIG. 9 is an example non-limiting diagram showing the movement of an object camera CO.

Next, the movement and the rotation of the object camera CO are described. FIG. 9 is a diagram showing the movement of the object camera CO. As described above, the moving object TO automatically moves along the path determined in advance in the virtual space. Specifically, when a player character P is on the moving object TO, the moving object TO moves toward the territory of the opposing team of the player character P along the path determined in advance. For example, when the territory of the team B is on the right side shown in FIG. 9, and the territory of the team A is on the left side shown in FIG. 9, and while the player character Pd on the team B is on the moving object TO, the moving object TO moves toward the left side shown in FIG. 9. Further, when the player character Pb on the team A is on the moving object TO, the moving object TO moves toward the right side (the territory of the team B) shown in FIG. 9.

Since the moving object TO automatically moves along the path determined in advance in the virtual space, the movement path of the moving object TO or the moving velocity of the moving object TO cannot be changed by an operation of a player. It should be noted that the movement path of the moving object TO or change the moving velocity or the moving object TO may be able to be changed by an operation of a player.

The object camera CO also moves following the moving object TO. Specifically, the gaze point FO of the object camera CO is fixed at the position of the moving object TO. The position (the viewpoint) of the object camera CO is set to a position a predetermined distance away from the gaze point FO in a predetermined direction in the virtual space (a direction having a component in the positive y-axis direction). Specifically, the position of the object camera CO is calculated by adding an arm vector VO to the position vector of the gaze point FO. Here, the arm vector VO is a vector forming a predetermined angle with the xz plane in the virtual space and having a predetermined length.

It should be noted that in the exemplary embodiment, the length of the arm vector VO is fixed. Alternatively, the length of the arm vector VO may be variable in accordance with an operation of the watcher.

Figure 10:
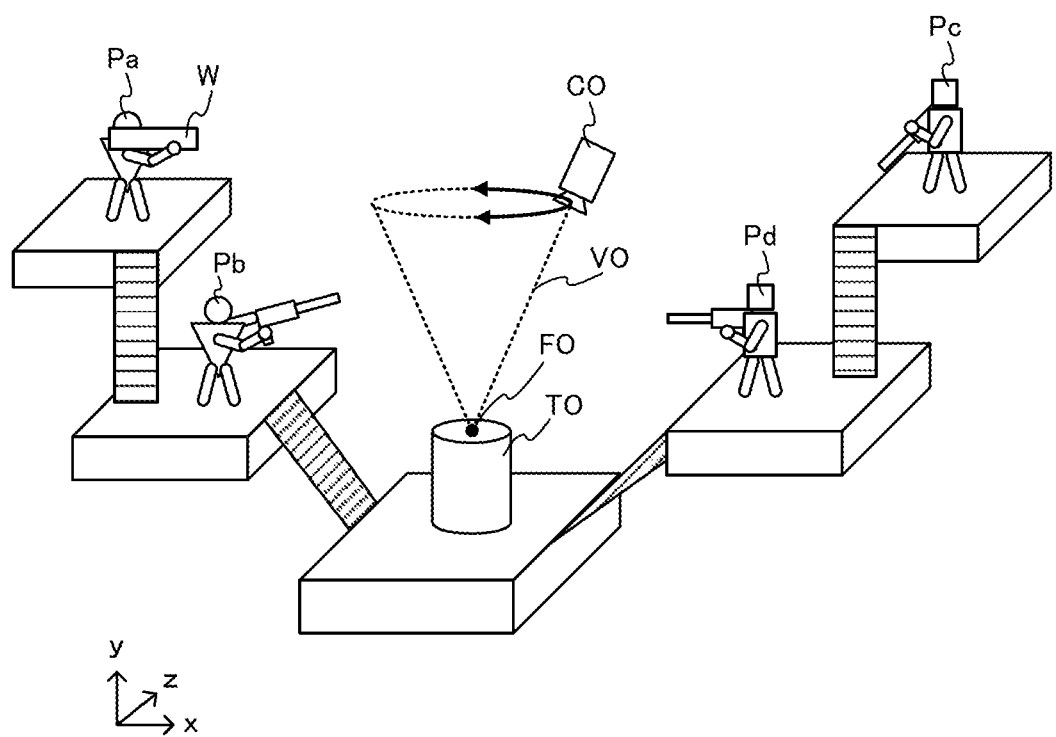
FIG. 10 is an example non-limiting diagram showing the rotation of the object camera CO.

FIG. 10 is a diagram showing the rotation of the object camera CO. As shown in FIG. 10, the object camera CO rotates in accordance with an operation of the watcher. Specifically, when an operation is performed by the watcher on the right analog stick of the controller of the game apparatus 10, the object camera CO rotates about a straight line passing through the gaze point FO and parallel to the y-axis in the virtual space. More specifically, the arm vector VO of the object camera CO rotates about the straight line passing through the gaze point FO and parallel to the y-axis, whereby the object camera CO rotates about the moving object TO.

As described above, the watcher can view an image of the virtual space viewed from the object camera CO following the moving object TO, and rotate the object camera CO about the moving object TO. Thus, using the object camera CO, the watcher can always view the periphery of the moving object TO, which is important in the game according to the exemplary embodiment.

(Changes in Orientations of Bird's-Eye Camera CB and Object Camera CO)

Here, the watcher operates the controller of the game apparatus 10 and thereby can change the orientations (the directions) of the bird's-eye camera CB and the object camera CO. For example, the watcher changes the orientation of the controller of the watcher terminal in real space and thereby can change the orientation of the bird's-eye camera CB. Similarly, the watcher changes the orientation of the controller of the watcher terminal and thereby can change the orientation of the object camera CO.

FIG. 11 is a diagram showing a camera coordinate system of the bird's-eye camera CB in a case where the orientation of the bird's-eye camera CB is not changed. As shown in FIG. 11, a Zc axis in a camera coordinate system (an XcYcZc coordinate system) fixed to the bird's-eye camera CB is an axis parallel to the image capturing direction (or the direction of the line of sight) of the bird's-eye camera CB. An Xc axis in the camera coordinate system of the bird's-eye camera CB is an axis perpendicular to the Zc axis and parallel to the right direction of the bird's-eye camera CB (the depth direction of the plane of the paper in FIG. 11). Further, a Yc axis in the camera coordinate system of the bird's-eye camera CB is an axis perpendicular to the Zc axis and the Xc axis and parallel to the up direction of the bird's-eye camera CB. In a case where the orientation of the bird's-eye camera CB is not changed (i.e., in a case where the bird's-eye camera CB is in the reference orientation), the gaze point FB is present on the Zc axis of the bird's-eye camera CB.

Further, although not shown in the figures, a camera coordinate system fixed to the object camera CO is also set for the object camera CO. For example, a Zc axis is set in the image capturing direction of the object camera CO. An Xc axis is set in the right direction of the object camera CO. A Yc axis is set in the up direction of the object camera CO. In a case where the orientation of the object camera CO is not changed (i.e., in a case where the object camera CO is in the reference orientation), the gaze point FO is present on the Zc axis in the camera coordinate system of the object camera CO.

Figure 12A:
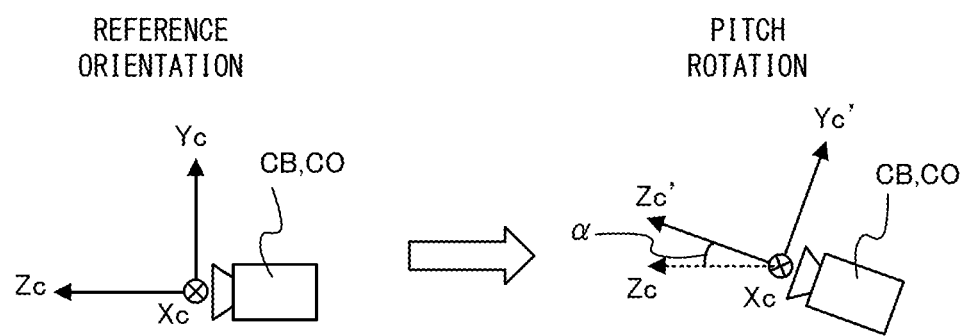
FIG. 12A is an example non-limiting diagram showing a change in the bird's-eye camera CB or the object camera CO from a reference orientation and showing rotation in a pitch direction.
Figure 12B:
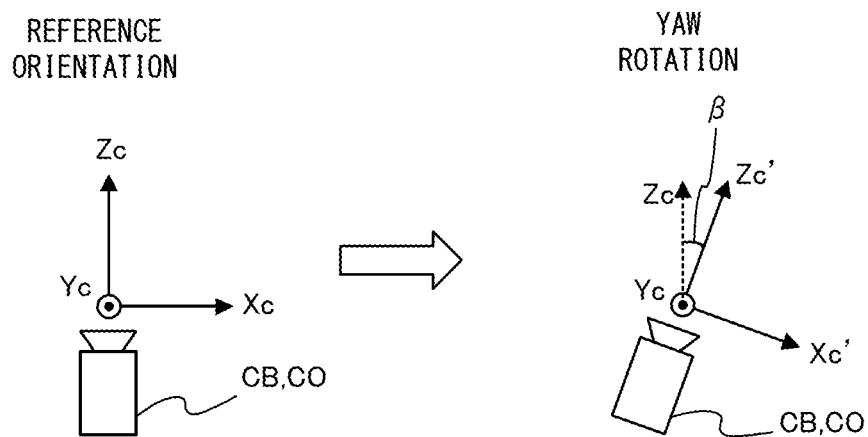
FIG. 12B is an example non-limiting diagram showing a change in the bird's-eye camera CB or the object camera CO from the reference orientation and showing rotation in a yaw direction.

FIG. 12A is a diagram showing a change in the bird's-eye camera CB or the object camera CO from the reference orientation and showing rotation in a pitch direction. FIG. 12B is a diagram showing a change in the bird's-eye camera CB or the object camera CO from the reference orientation and showing rotation in a yaw direction. FIG. 12A is a diagram showing the bird's-eye camera CB or the object camera CO viewed from a position further in a negative Xc axis direction than the bird's-eye camera CB or the object camera CO. FIG. 12B is a diagram showing the bird's-eye camera CB or the object camera CO viewed from a position further in a positive Yc axis direction than the bird's-eye camera CB or the object camera CO.

As shown in FIG. 12A, the bird's-eye camera CB or the object camera CO can rotate by a predetermined angle in a pitch direction (about the Xc axis) from the reference orientation. In FIG. 12A, the Xc axis, the Yc axis, and the Zc axis are axes in the camera coordinate system in the reference orientation. A Zc' axis is the Zc axis after the bird's-eye camera CB or the object camera CO is rotated in the pitch direction. Further, a Yc' axis is the Yc axis after the bird's-eye camera CB or the object camera CO is rotated in the pitch direction.

As shown in FIG. 12A, for example, when the watcher tilts the controller of the game apparatus 10 in the up direction (tilts the controller so that a back surface of the controller is directed upward), the bird's-eye camera CB or the object camera CO rotates about the Xc axis, and the Zc axis is directed in the up direction. Further, for example, when the watcher tilts the controller of the game apparatus 10 in the down direction (tilts the controller so that the back surface of the controller is directed downward), the bird's-eye camera CB or the object camera CO rotates about the Xc axis, and the Zc axis is directed in the down direction. This rotational angle about the Xc axis is referred to as a "pitch angle α".

Further, as shown in FIG. 12B, the bird's-eye camera CB or the object camera CO can rotate by a predetermined angle in a yaw direction (about the Yc axis) from the reference orientation. In FIG. 12B, the Xc axis, the Yc axis, and the Zc axis are axes in the camera coordinate system in the reference orientation. A Zc' axis is the Zc axis after the bird's-eye camera CB or the object camera CO is rotated in the yaw direction. Further, an Xc' axis is the Xc axis after the bird's-eye camera CB or the object camera CO is rotated in the yaw direction.

As shown in FIG. 12B, for example, when the watcher directs the controller of the game apparatus 10 in the right direction (directs the back surface of the controller to the right), the bird's-eye camera CB or the object camera CO rotates about the Yc axis, and the Zc axis is directed in the right direction. Further, for example, when the watcher directs the controller of the game apparatus 10 in the left direction (directs the back surface of the controller to the left), the bird's-eye camera CB or the object camera CO rotates about the Yc axis, and the Zc axis is directed in the left direction. This rotational angle about the Yc axis is referred to as a "yaw angle $\beta$".

The pitch angle $\alpha$ and the yaw angle $\beta$ shown in FIGS. 12A and 12B are information indicating an orientation based on the camera coordinate system. The "orientation information of the virtual camera", which is one of the above camera parameters, is information indicating an orientation based on the xyz coordinate system (the global coordinate system).

Hereinafter, a pitch angle based on the xyz coordinate system will be referred to as a "pitch angle $G\alpha$", and a yaw angle based on the xyz coordinate system will be referred to as a "yaw angle $G\beta$". For example, the pitch angle $G\alpha$ in the xyz coordinate system may be the angle between the Zc axis of the virtual camera and the xz plane in the virtual space. Further, for example, the yaw angle $G\beta$ in the xyz coordinate system may be the angle between the Zc axis of the virtual camera and the yz plane in the virtual space. The pitch angle $G\alpha$ and the yaw angle $G\beta$ in the xyz coordinate system of the virtual camera can be calculated based on the arm vector V of the virtual camera and the pitch angle $\alpha$ and the yaw angle $\beta$ in the camera coordinate system of the virtual camera.

As described above, the watcher tilts the controller of the game apparatus 10 in the up-down direction or directs the controller in the left-right direction, and thereby can change the orientation of the bird's-eye camera CB or the object camera CO.

It should be noted that the gaze point FB of the bird's-eye camera CB shown in FIGS. 5 to 7 is a gaze point in the reference orientation. The above movement of the bird's-eye camera CB is made by moving the gaze point FB in this reference orientation. Even when the bird's-eye camera CB is rotated in the pitch direction or rotated in the yaw direction in the camera coordinate system, the position of the gaze point FB (the gaze point FB as one of the camera parameters) on the control surfaces, which is used for the movement of the bird's-eye camera CB shown in FIGS. 5 to 7, does not change.

The position and the orientation of the bird's-eye camera CB in the xyz coordinate system are determined as follows. First, as described above in FIGS. 5 to 7, when a movement operation is performed by the watcher using the left analog stick of the controller, the gaze point FB in the reference orientation moves on the control surfaces. Next, as shown in FIG. 8, in accordance with a rotation operation by the watcher using the right analog stick of the controller, the arm vector VB is rotated in the virtual space. Consequently, a position obtained by adding the arm vector VB to the moved gaze point FB is determined as the position (the viewpoint) of the bird's-eye camera CB. Then, in accordance with the orientation of the controller, the pitch angle $\alpha$ and the yaw angle $\beta$ in the camera coordinate system of the bird's-eye camera CB are calculated, and the orientation (the pitch angle $G\alpha$ and the yaw angle $G\beta$) in the xyz coordinate system of the bird's-eye camera CB is calculated.

The same applies to the position and the orientation of the object camera CO in the xyz coordinate system. That is, as described above in FIG. 9. in accordance with the movement of the moving object TO, the gaze point FO of the object camera CO in the reference orientation moves. Next, as described above in FIG. 10, in accordance with a rotation operation by the watcher using the right analog stick of the controller, the arm vector VO is rotated in the virtual space. Consequently, a position obtained by adding the arm vector VO to the moved gaze point FO (the moved position of the moving object) is determined as the position (the viewpoint) of the object camera CO. Then, in accordance with the orientation of the controller, the pitch angle $\alpha$ and the yaw angle $\beta$ in the camera coordinate system of the object camera CO are calculated, and the orientation (the pitch angle $G\alpha$ and the yaw angle $G\beta$) in the xyz coordinate system of the object camera CO is calculated.

(Switching Between Virtual Cameras)

Figure 13:
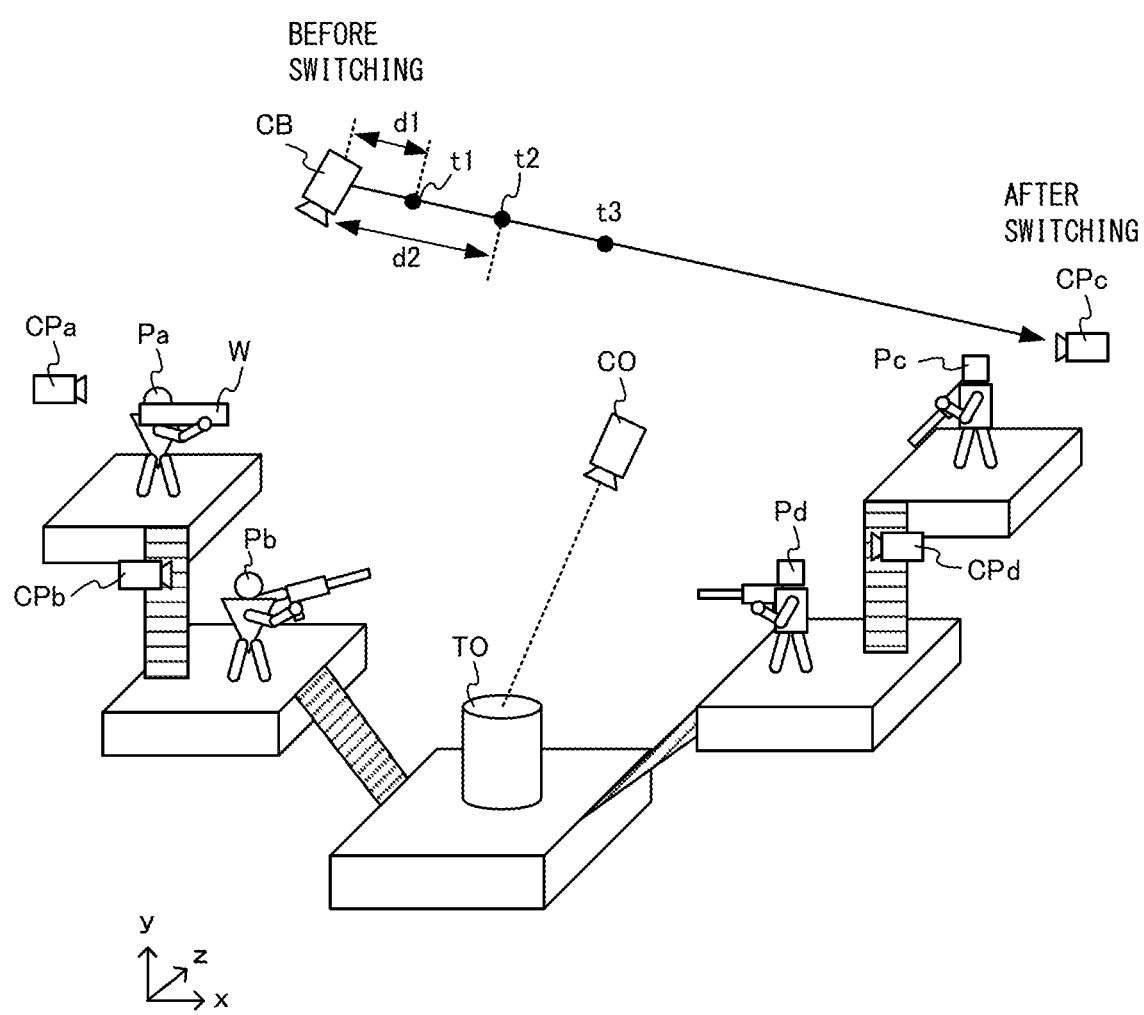
FIG. 13 is an example non-limiting diagram showing switching from the bird's-eye camera CB to a player camera CP.

Next, the switching between the above three types of virtual cameras (each player camera CP, the bird's-eye camera CB, and the object camera CO) is described. The watcher can switch the virtual cameras using one of the operation buttons of the controller of the game apparatus 10. FIG. 13 is a diagram showing the switching from the bird's-eye camera CB to the player camera CP.

As shown in FIG. 13, for example, when watching the game using the bird's-eye camera CB, then in accordance with an operation on one of the operation buttons of the controller, the watcher can switch a virtual camera for use in watching from the bird's-eye camera CB to, for example, the player camera CPc. The virtual camera automatically moving from a position before the switching to a position after the switching for a predetermined time, and the watcher can view an image during the switching of the virtual camera. It should be noted that a predetermined time for which the virtual camera is switched may be a fixed time or a time that is not fixed (e.g., a time that varies in accordance with the distance between the virtual camera before the switching and the virtual camera after the switching).

For example, a switching operation is assigned to each of the bird's-eye camera CB, the object camera CO, the player camera CPa, the player camera CPb, the player camera CPc, and the player camera CPd. In accordance with a switching operation performed on the controller, the virtual camera is switched to a virtual camera corresponding to the switching operation.

Specifically, if the watcher performs a switching operation for switching the virtual cameras, the camera parameters of the virtual cameras change from the camera parameters of the current virtual camera (e.g., the bird's-eye camera CB) to the camera parameters of the virtual camera after the switching (e.g., the player camera CPc) for a predetermined time. More specifically, the camera parameters (the gaze point F, the arm vector V, the pitch angle $G\alpha$, and the yaw angle $G\beta$) during the switching are calculated by interpolating by a Hermitian interpolation method the camera parameters before the switching and the camera parameters after the switching.

For example, as shown in FIG. 13, the gaze point F of the virtual camera at a time t1 when one frame time (e.g., 1/60 seconds) elapses after the watcher performs the switching operation for switching the virtual cameras is calculated by interpolating by the Hermitian interpolation method the gaze point FB of the bird's-eye camera CB before the switching and the gaze point FO of the player camera CPc after the switching. Similarly, the arm vector V of the virtual camera at the time t1 is calculated by interpolating by the Hermitian interpolation method the arm vector VB of the bird's-eye camera CB before the switching and the arm vector VO of the player camera CPc after the switching. Further, the pitch angle Gα of the virtual camera at the time t1 is calculated by interpolating by the Hermitian interpolation method the pitch angle Gα of the bird's-eye camera CB before the switching and the pitch angle Gα of the player camera CPc after the switching. Further, the yaw angle Gβ of the virtual camera at the time t1 is calculated by interpolating by the Hermitian interpolation method the yaw angle Gβ of the bird's-eye camera CB before the switching and the yaw angle Gβ of the player camera CPc after the switching.

The camera parameters of the virtual cameras during the switching are calculated by the Hermitian interpolation method. Thus, each camera parameter gradually changes from the value before the switching to the value after the switching. For example, in a first period after the switching operation is performed, the camera parameter changes by relatively slowly increasing its speed. In a second period after that, the camera parameter changes at a relatively high speed. Further, as the camera parameter comes close to the value after the switching, the camera parameter decreases its speed. Then, ultimately, the camera parameter reaches the value after the switching.

For example, as shown in FIG. 13, at the time t1 when one frame time elapses from the time when the switching operation is performed, the virtual camera is present at a position corresponding to a distance d1 from the position before the switching. At a time t2 when one frame time further elapses from the time t1, the virtual camera is present at a position corresponding to a distance d2 from the position of the virtual camera before the switching. At this time, the distance d2 is greater than twice the distance d1. Further, at a time t3 when one frame time further elapses from the time t2, the virtual camera comes close to the position of the virtual camera after the switching. The distance between the virtual camera at the time t2 and the virtual camera at the time t3 is greater than the distance between the virtual camera at the time t1 and the virtual camera at the time t2.

Further, the orientation of the virtual camera in the xyz coordinate system also gradually changes from the orientation before the switching to the orientation after the switching. For example, the pitch angle Gα of the virtual camera at the time t1 is a value between the pitch angle Gα of the virtual camera before the switching and the pitch angle Gα of the virtual camera after the switching. The amount of change in the pitch angle Gα at the time t2 is greater than the amount of change in the pitch angle Gα at the time t1.

As described above, when the bird's-eye camera CB switches to the player camera CP, the switching is performed over a plurality of frames, and the position and the orientation of the virtual camera are calculated in each frame. Thus, an image viewed from the virtual camera in the middle of the switching is displayed on the display device of the watcher terminal.

For example, when in accordance with a switching operation for switching the virtual cameras, the bird's-eye camera CB instantly switches to the player camera CP (i.e., when an image viewed from the bird's-eye camera CB is displayed in a certain frame, and an image viewed from the player camera CP is displayed in the next frame), it is difficult for the watcher to recognize from which position to which position in the virtual space the virtual camera moves. In the exemplary embodiment, however, the virtual cameras are switched for a plurality of frame times, and an image in the middle of the switching is displayed. Thus, the watcher can easily recognize from which position to which position in the virtual space the virtual camera moves.

Further, in the exemplary embodiment, the camera parameters of the virtual camera during the switching are calculated by Hermitian interpolation. Thus, each camera parameter changes by first coming close to the value after the switching while slowly accelerating, and by finally coming close to the value after the switching while slowly decelerating. Consequently, it is possible to prevent so-called video sickness (simulator sickness).

It should be noted that the camera parameters during the switching between the virtual cameras may be calculated not only by the Hermitian interpolation method but also by another interpolation method (e.g., linear interpolation, spline interpolation, Lagrangian interpolation, or the like).

(Example of Image Displayed on Screen)

Figure 14:
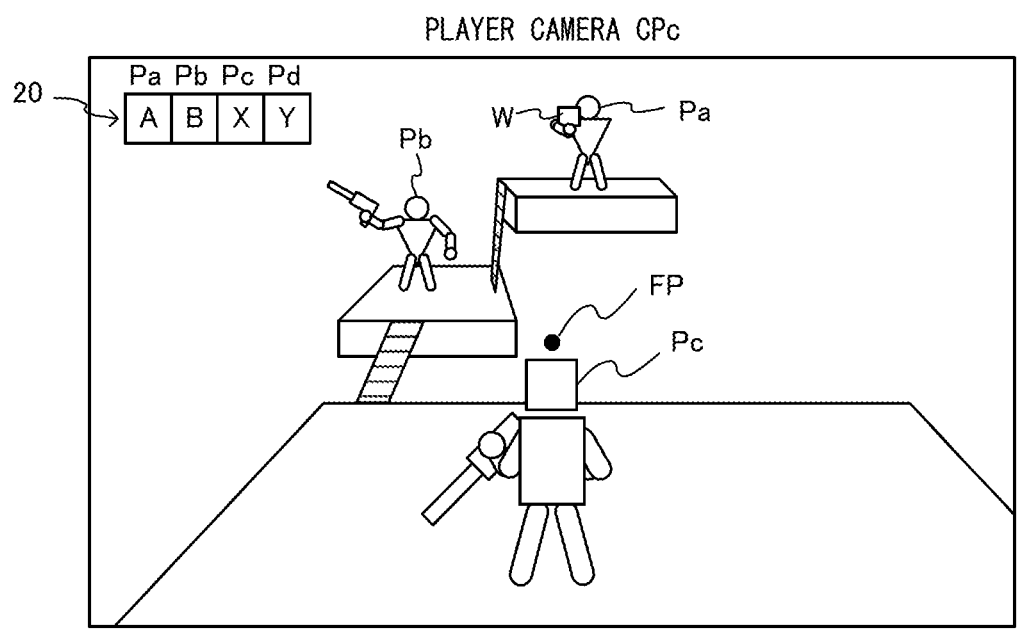
FIG. 14 is an example non-limiting diagram showing an example of an image displayed on a screen of a display device of a watcher terminal and a game image generated based on a player camera CPc, which corresponds to a player character Pc.

FIG. 14 is a diagram showing an example of an image displayed on the screen of the display device of the watcher terminal and a game image generated based on the player camera CPc, which corresponds to the player character Pc. As shown in FIG. 14, the player camera CPc is placed at a predetermined position behind the player character Pc. The gaze point FP of the player camera CPc is fixed to the player character Pc and is set, for example, over the head of the player character Pc. It should be noted that in accordance with an operation of the player of game apparatus 10c, the player camera CPc can rotate about the player character Pc. Further, the orientation of the player camera CPc can be changed in accordance with the orientation of the controller of the game apparatus 10c.

As shown in FIG. 14, for example, a switching operation image 20 for a switching operation for switching the virtual cameras is displayed in an upper area of the screen. The switching operation image 20 is an image representing a switching operation for switching to each player camera CP. For example, the switching operation image 20 means that the switching to the player camera CPa, which corresponds to the player character Pa, is performed by an operation on an A-button, and the switching to the player camera CPb, which corresponds to the player character Pb, is performed by an operation on a B-button. The image shown in FIG. 14 is basically the same image as an image viewed by the player of the game apparatus 10c (an image displayed on the screen of the display device of the game apparatus 10c). That is, on a player terminal, a game image based on the player camera CP is displayed. On a watcher terminal, a game image based on a player camera having the same position and orientation (direction) as those of the player camera CP corresponding to this player terminal is displayed. The switching operation image 20, however, is displayed only on the watcher terminal, and is not displayed on the player terminal.

Figure 15:
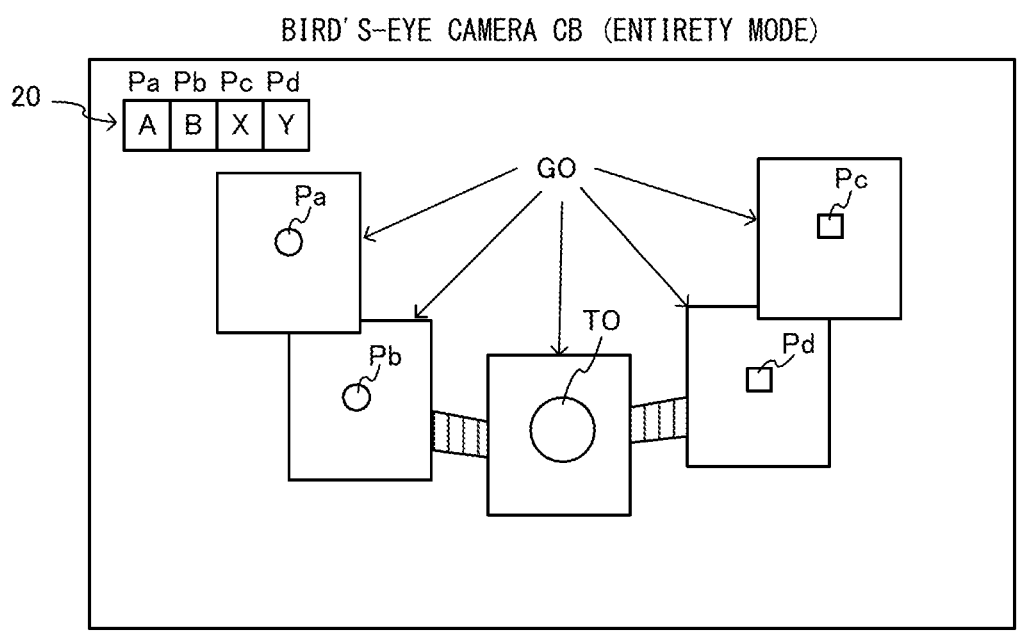
FIG. 15 is an example non-limiting diagram showing an example of an image displayed on the screen of the display device of the watcher terminal and a game image generated based on the bird's-eye camera CB in an entirety mode.

FIG. 15 is a diagram showing an example of an image displayed on the screen of the display device of the watcher terminal and a game image generated based on the bird's-eye camera CB in the entirety mode. As shown in FIG. 15, when the bird's-eye camera CB is in the entirety mode, an image viewed from almost directly above in the virtual space is displayed on the display device of the watcher terminal, and the entirety of the virtual space is displayed. The player characters Pa to Pd, the moving object TO, and the plurality of geographical objects GO are displayed on the screen.

Figure 16:
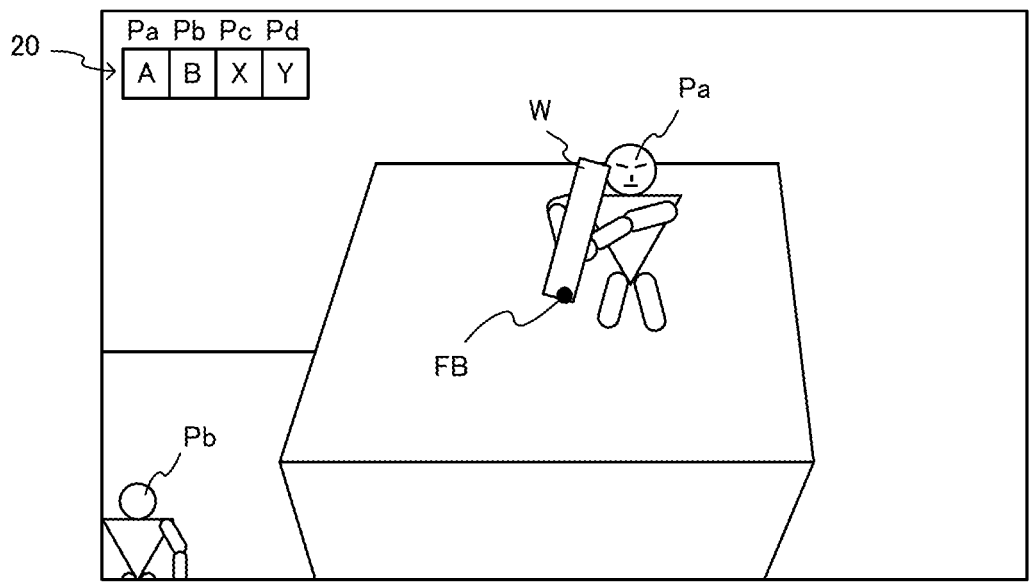
FIG. 16 is an example non-limiting diagram showing an example of an image displayed on the screen of the display device of the watcher terminal and a game image generated based on the bird's-eye camera CB in the zoom mode.
Figure 17:
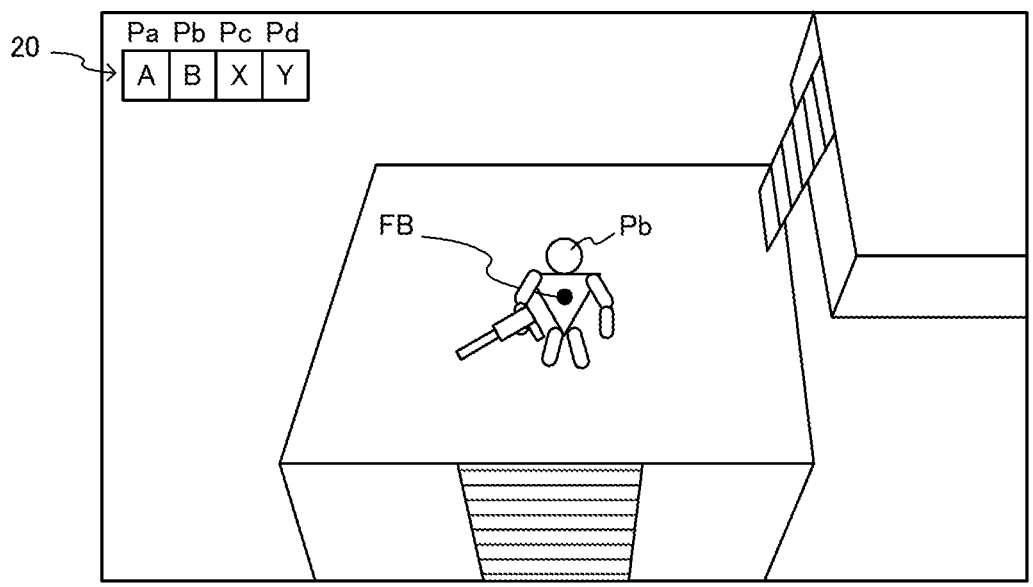
FIG. 17 is an example non-limiting diagram showing an example of a game image when the bird's-eye camera CB is moved from a state in FIG. 16 to the position of a player character Pb.
Figure 18:
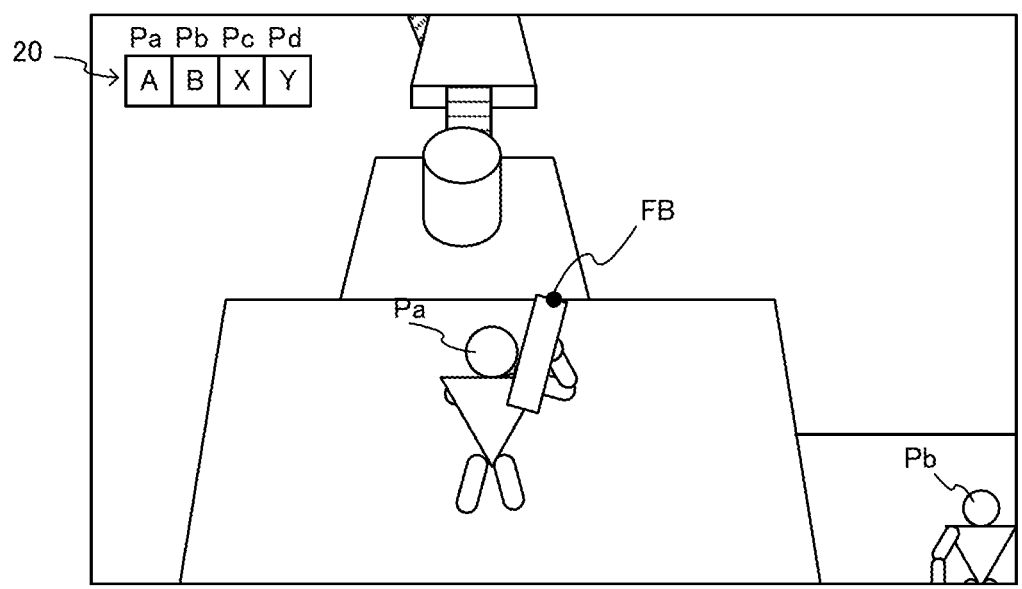
FIG. 18 is an example non-limiting diagram showing an example of a game image when the bird's-eye camera CB is rotated 180 degrees from the state in FIG. 16.

FIG. 16 is a diagram showing an example of an image displayed on the screen of the display device of the watcher terminal and a game image generated based on the bird's- eye camera CB in the zoom mode. FIG. 17 is a diagram showing an example of a game image when the bird's-eye camera CB is moved from the state in FIG. 16 to the position of the player character Pb. FIG. 18 is a diagram showing an example of a game image when the bird's-eye camera CB is rotated 180 degrees from the state in FIG. 16.

As shown in FIG. 16, when the bird's-eye camera CB is in the zoom mode, the watcher can view an image obtained by enlarging a partial area in the virtual space. As described above, the watcher can move the bird's-eye camera CB in the zoom mode and watch the game by enlarging a desired area in the virtual space. For example, the watcher can move the bird's-eye camera CB to the periphery of the player character Pa and view the periphery of the player character Pa. It should be noted that in FIG. 16, the bird's-eye camera CB is in the reference orientation, and the gaze point FB of the bird's-eye camera CB is located at the center of the screen.

If the watcher operates the left analog stick of the controller of the game apparatus 10 when the image shown in FIG. 16 is displayed, the bird's-eye camera CB moves in accordance with this operation, and the position in the height direction of the bird's-eye camera CB also changes. The bird's-eye camera CB moves at a predetermined velocity in a direction corresponding to the direction of the operation on the left analog stick. On the screen of the watcher terminal, an image during the movement of the bird's-eye camera CB is displayed. Then, an image as shown in FIG. 17 is displayed on the display device of the watcher terminal. The height of the bird's-eye camera CB when the image shown in FIG. 17 is displayed is lower than the height of the bird's-eye camera CB when the image shown in FIG. 16 is displayed.

Further, if the watcher operates the right analog stick of the controller of the game apparatus 10 when the image shown in FIG. 16 is displayed, the bird's-eye camera CB rotates in accordance with this operation. The bird's-eye camera CB rotates at a predetermined velocity in a direction corresponding to the direction of the operation on the right analog stick. On the screen of the watcher terminal, an image during the rotation of the bird's-eye camera CB is displayed. Then, an image as shown in FIG. 18 is displayed on the display device of the watcher terminal.

Figure 19:
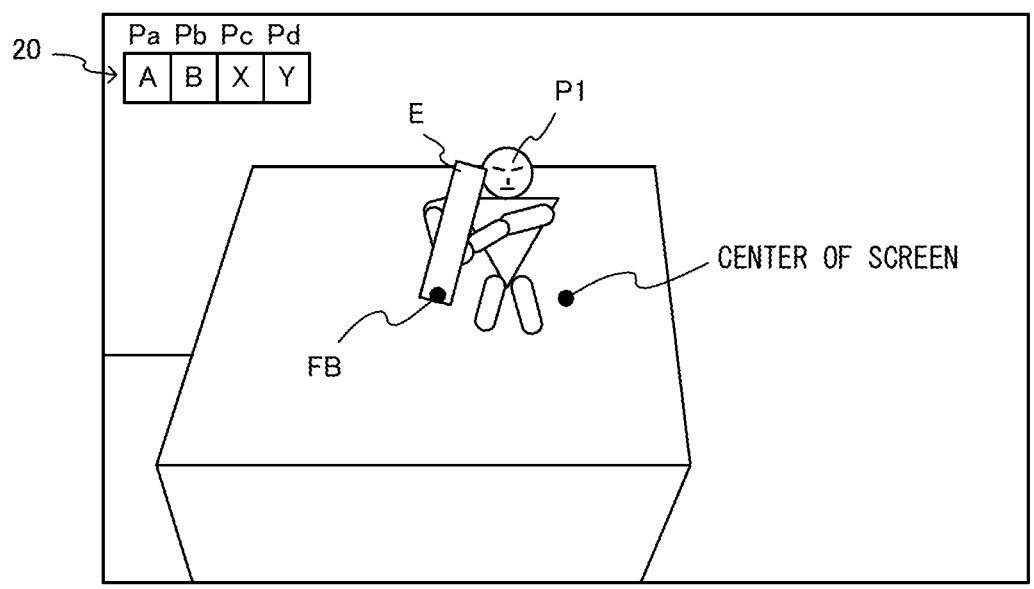
FIG. 19 is an example non-limiting diagram showing an example of a game image when the orientation of a controller is changed from the state in FIG. 16.

FIG. 19 is a diagram showing an example of a game image when the orientation of the controller is changed from the state in FIG. 16.

As shown in FIG. 19, for example, if the watcher directs the controller of the game apparatus 10 in the right direction, the bird's-eye camera CB rotates in the yaw direction, and an image of the right side of the virtual space in FIG. 16 is displayed. Here, as shown in FIG. 19, even when the orientation of the bird's-eye camera CB is changed, the position of the gaze point FB (the gaze point FB as one of the camera parameters) of the bird's-eye camera CB does not change. That is, although the center of the actual image moves by changing the orientation of the bird's-eye camera CB, the gaze point FB as one of the camera parameters of the bird's-eye camera CB does not move in the virtual space.

Figure 20:
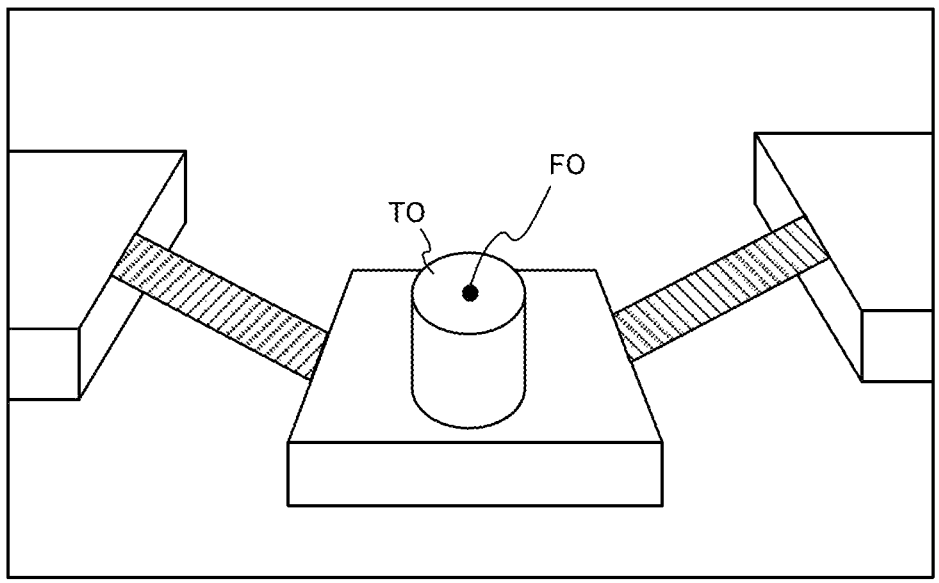
FIG. 20 is an example non-limiting diagram showing an example of an image displayed on the screen of the display device of the watcher terminal and a game image generated based on the object camera CO.
Figure 21:
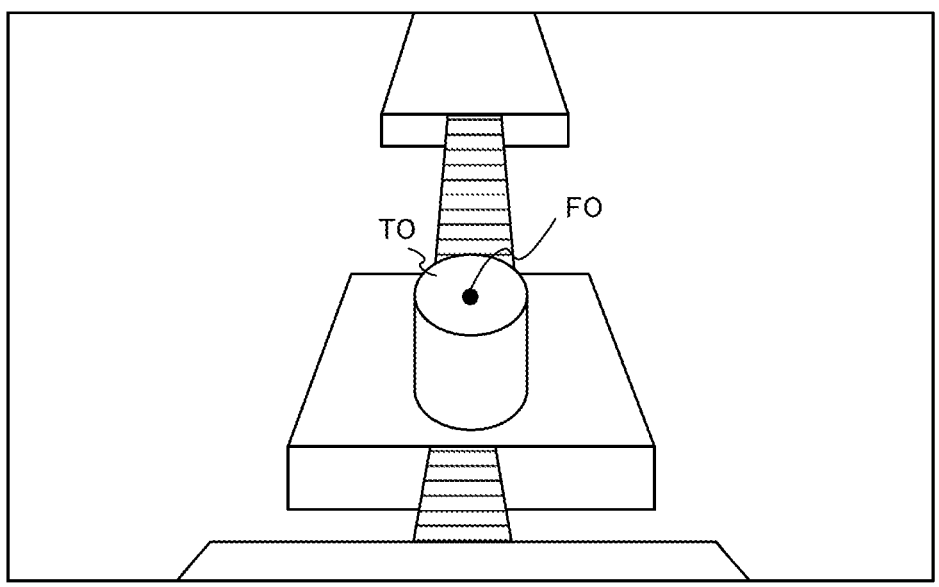
FIG. 21 is an example non-limiting diagram showing an example of an image when the object camera CO is rotated 180 degrees from a state in FIG. 20.

FIG. 20 is a diagram showing an example of an image displayed on the screen of the display device of the watcher terminal and a game image generated based on the object camera CO. FIG. 21 is a diagram showing an example of an image when the object camera CO is rotated 180 degrees from the state in FIG. 20.

As shown in FIG. 20, the watcher can view the periphery of the moving object TO in the virtual space using the object camera CO. It should be noted that in FIG. 20, the object camera CO is in the reference orientation, and the gaze point FO of the object camera CO is located at the center of the screen. When the watcher changes the orientation of the controller of the game apparatus 10 in this state, the object camera CO rotates in the pitch direction or the yaw direction, and similarly to FIG. 19, the center of the screen moves in the up-down direction or the left-right direction. In this case, the gaze point FO of the object camera CO does not coincide with the center of the screen.

If the watcher operates the right analog stick of the controller of the game apparatus 10 when the image shown in FIG. 20 is displayed, the object camera CO rotates in accordance with this operation. The object camera CO rotates at a predetermined velocity in a direction corresponding to the direction of the operation on the right analog stick. On the screen of the watcher terminal, an image during the rotation of the object camera CO is displayed. Then, an image as shown in FIG. 21 is displayed on the display device of the watcher terminal.

(Details of Processing Performed by Each Game Apparatus)

Next, processing performed by each game apparatus is described. First, data stored in the watcher terminal is described, and then, information processing performed by the watcher terminal is described.

(Data Stored in Watcher Terminal)

Figure 22:
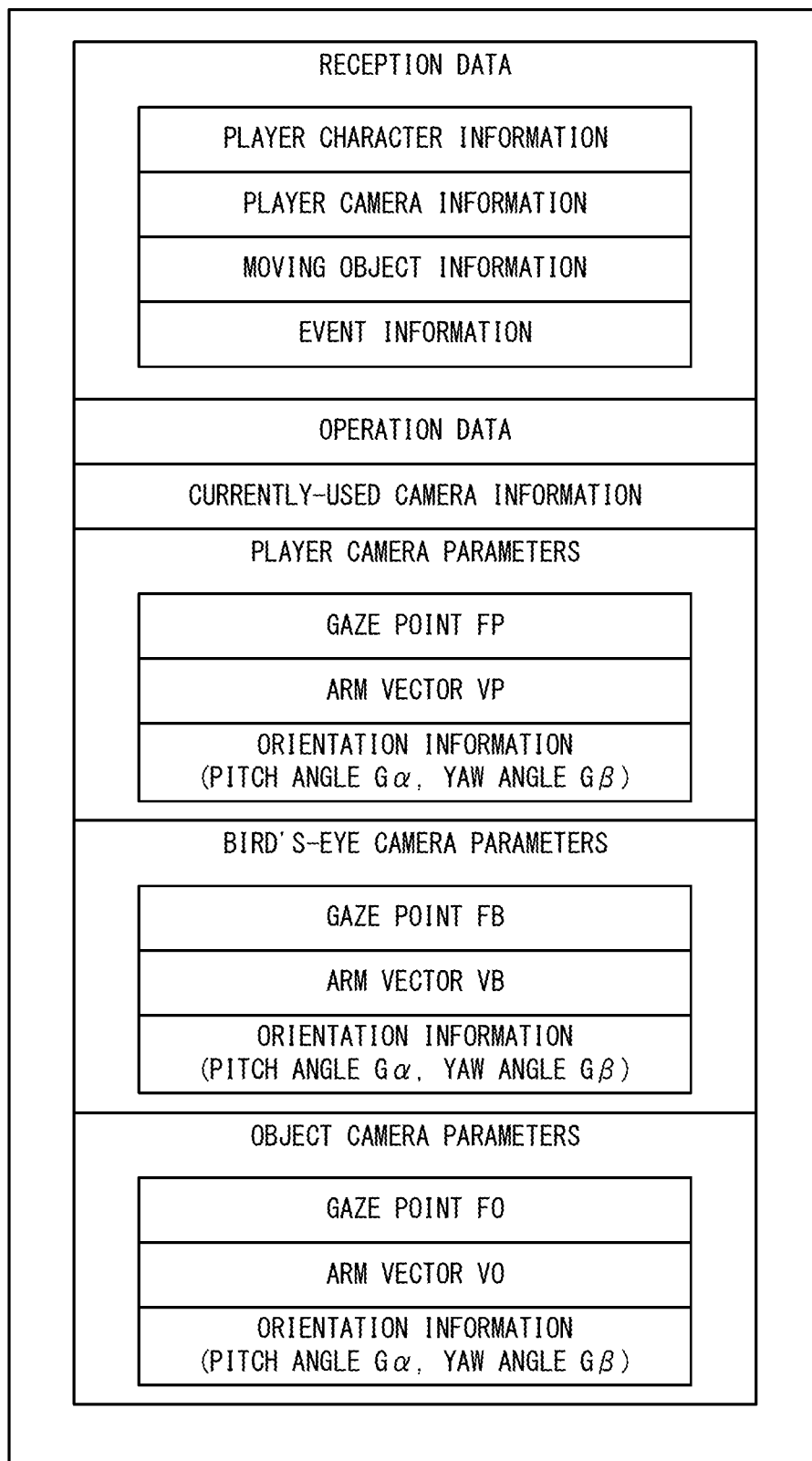
FIG. 22 is an example non-limiting diagram showing an example of data stored in a memory 12 of the game apparatus 10 of the watcher.

FIG. 22 is a diagram showing an example of data stored in the memory 12 of the game apparatus 10 of the watcher.

As shown in FIG. 22, while a game program is executed, reception data, operation data, currently-used camera information, player camera parameters, bird's-eye camera parameters, and object camera parameters are stored in the memory of the watcher terminal. It should be noted that in the memory of the watcher terminal, various types of data and programs other than those shown in FIG. 22 are also stored.

The reception data is data received via the network and play data generated in accordance with an operation performed on another game apparatus 10. Specifically, the reception data includes "player character information", "player camera information", "moving object information", and "event information". The "player character information" is information regarding each player character P and includes the position, the orientation, the moving velocity, the jump velocity, and the like of each player character P in the virtual space. Further, the "player camera information" is information regarding the camera parameters of the player camera CP corresponding to each player character P and includes the pitch angle $G\alpha$ and the yaw angle $G\beta$ in the xyz coordinate system and the arm vector VP in the xyz coordinate system. The "moving object information" includes the position, the moving direction, the moving velocity, and the like of the moving object TO. The "event information" is information regarding an event having occurred in the game (e.g., the fact that each player character P shoots a bullet, the fact that the geographical objects GO are painted with a shot bullet, the fact that a shot bullet hits a player character P, or the like).

The "operation data" is data corresponding to an operation on the controller of the watcher terminal and includes operation information of the operation buttons 16, operation information of the analog sticks 17, and detection information of the inertial sensors 18. The "currently-used camera information" is information indicating a virtual camera that is currently being used (specified) by the watcher, and information indicating any of the player cameras CPa to CPd, the bird's-eye camera CB, and the object camera CO.

Further, the currently-used camera information includes information indicating whether or not the virtual cameras are currently being switched, and the camera parameters during the switching between the virtual cameras.

The player camera parameters are the camera parameters of each player camera CP calculated from the reception data. The player camera parameters include the gaze point FP, the arm vector VP, and the orientation information of each player camera CP. The orientation information is the pitch angle $G\alpha$ and the yaw angle $G\beta$ in the xyz coordinate system of the player camera CP.

The bird's-eye camera parameters include the gaze point FB, the arm vector VB, and the orientation information (the pitch angle $G\alpha$ and the yaw angle $G\beta$ in the xyz coordinate system).

Further, the object camera parameters include the gaze point FO, the arm vector VO, and the orientation information (the pitch angle $G\alpha$ and the yaw angle $G\beta$ in the xyz coordinate system).

(Details of Processing Performed by Watcher Terminal)

Figure 23:
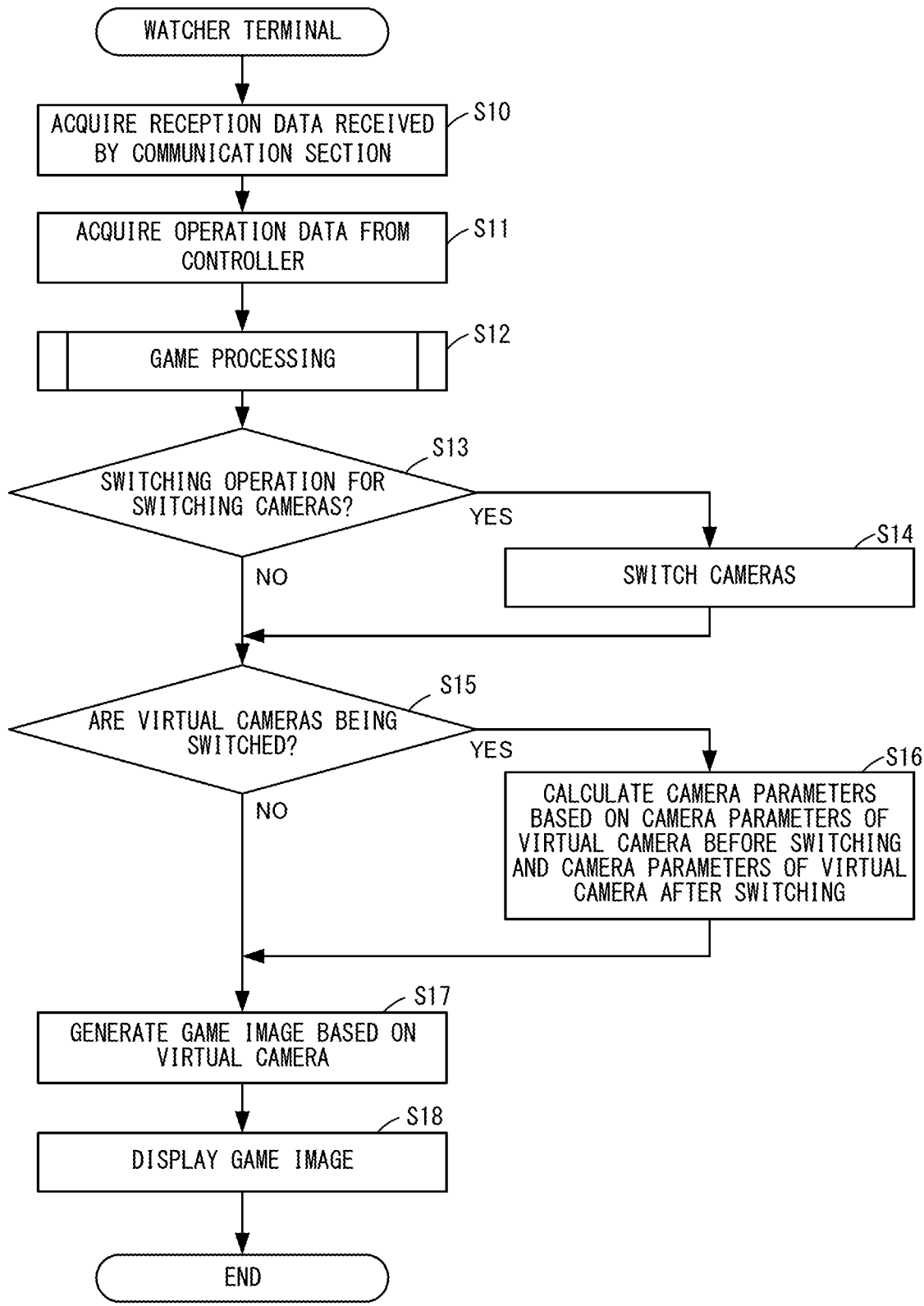
FIG. 23 is an example non-limiting flow chart showing the details of information processing performed by the watcher terminal.

Next, the details of processing performed by the game apparatus 10 of the watcher are described. FIG. 23 is a flow chart showing the details of information processing performed by the watcher terminal. The processing shown in FIG. 23 is performed by the processor 11 of the game apparatus 10 executing a predetermined game program (an information processing program). The processor 11 of the game apparatus 10 repeatedly executes the processing shown in FIG. 23, for example, at 1/60-second intervals (one frame time).

As shown in FIG. 23, first, the processor 11 of the watcher terminal (hereinafter referred to simply as the "watcher terminal" in flow charts) acquires reception data received by the communication section 14 via the network (step S10). When the communication section 14 receives reception data, the reception data is temporarily stored in the memory. The watcher terminal acquires the stored reception data in step S10. Next, the watcher terminal acquires operation data from the controller of the watcher terminal (step S11).

Next, using the reception data acquired in step S10 and the operation data acquired in step S11, the watcher terminal executes game processing (step S12). With reference to FIG. 24, the details of the game processing in step S12 are described below.

(Game Processing Performed by Watcher Terminal)

FIG. 24 is a flow chart showing the details of the game processing in step S12 in FIG. 23.

As shown in FIG. 24, the watcher terminal performs a character movement process (step S21). Specifically, based on the reception data, the watcher terminal updates the position of each player character P in the virtual space. As described above, the reception data includes the position, the direction, the moving velocity, the jump velocity, and the like of each player character P in the virtual space. Based on the position of each player character P included in the reception data, the watcher terminal moves each player character P in the virtual space. Further, in the character movement process, based on the reception data, the watcher terminal changes the direction of each player character P or causes each player character P to jump.

Next, the watcher terminal performs a bullet shooting process (step S22). In the bullet shooting process, based on the reception data, the watcher terminal determines whether or not each player character P shoots a bullet (liquid). When each player character P shoots a bullet, the watcher terminal causes the player character P to shoot the bullet in the virtual space. The event information of the reception data includes the shooting position and the shooting direction of a bullet. Based on the shooting position and the shooting direction of a bullet included in the reception data, the watcher terminal moves the bullet in the virtual space.

Next, the watcher terminal performs an object movement process (step S23). The reception data includes information of the position, the moving velocity, the moving direction, and the like of the moving object TO. In the object movement process, based on the position, the moving velocity, and the moving direction of the moving object TO included in the reception data, the watcher terminal moves the moving object TO in the virtual space.

Next, the watcher terminal performs a camera parameter update process (step S24), and ends the processing shown in FIG. 24. With reference to FIG. 25, the details of the camera parameter update process in step S24 are described below.

(Camera Parameter Update Process Performed by Watcher Terminal)

FIG. 25 is a flow chart showing the details of the camera parameter update process in step S24 in FIG. 24.

As shown in FIG. 25, based on the currently-used camera information stored in the memory 12, the watcher terminal determines whether or not a virtual camera that is currently being used is the bird's-eye camera CB (step S31). When the bird's-eye camera CB is being used (step S31: YES), then next, the processes of steps S32 to S35, S40, and S41 are performed. It should be noted that the processes of steps S32 to S35, S40, and S41 shown below are performed only when the bird's-eye camera CB is in the zoom mode. When the bird's-eye camera CB is in the entirety mode, the bird's-eye camera CB is set to a fixed position and a fixed orientation. The zoom mode and the entirety mode of the bird's-eye camera CB are switched by operating a predetermined operation button of the controller of the watcher terminal.

When the bird's-eye camera CB is being used (step S31: YES), then based on the operation data, the watcher terminal determines whether or not a movement operation for moving the bird's-eye camera CB is performed (step S32). Specifically, the watcher terminal determines whether or not the left analog stick of the controller is operated.

When a movement operation for moving the bird's-eye camera CB is performed (step S32: YES), the watcher terminal performs a movement process for moving the bird's-eye camera CB (step S33). Here, as described above, the watcher terminal moves the gaze point FB of the bird's-eye camera CB on the control surfaces M1 to M5. Specifically, based on the operation direction and the operation amount of the left analog stick of the controller, the watcher terminal calculates the moving direction and the moving amount of the gaze point FB in the virtual space. The moving direction of the gaze point FB is a direction parallel to the control surfaces. Then, using the calculated moving direction and moving amount, the watcher terminal updates the gaze point FB of the bird's-eye camera parameters stored in the memory.

When the process of step S33 is performed, or when the determination is NO in step S32, then based on the operation data, the watcher terminal determines whether or not a rotation operation for rotating the bird's-eye camera CB is performed (step S34). Specifically, the watcher terminal determines whether or not the right analog stick of the controller is operated.

When a rotation operation for rotating the bird's-eye camera CB is performed (step S34: YES), the watcher terminal performs a rotation process for rotating the bird's-eye camera CB (step S35). Specifically, based on the operation direction and the operation amount of the right analog stick of the controller, the watcher terminal calculates the rotation direction and the rotation amount of the bird's-eye camera CB in the virtual space. Then, using the calculated rotation direction and rotation amount, the watcher terminal updates the arm vector VB of the bird's-eye camera parameters stored in the memory. Consequently, the arm vector VB rotates about a straight line parallel to the y-axis (FIG. 8).

On the other hand, when the bird's-eye camera CB is not being used (step S31: NO), then based on the currently-used camera information, the watcher terminal determines whether or not the object camera CO is currently being used (step S36).

When the object camera CO is currently being used (step S36: YES), the watcher terminal performs a movement process for moving the object camera CO (step S37). Here, the watcher terminal sets the position of the object camera CO to the position of the moving object TO calculated in step S23, thereby updating the object camera parameter.

When the process of step S37 is performed, then based on the operation data, the watcher terminal determines whether or not a rotation operation for rotating the object camera CO is performed (step S38). Specifically, the watcher terminal determines whether or not the right analog stick of the controller is operated.

When a rotation operation for rotating the object camera CO is performed (step S38: YES), the watcher terminal performs a rotation process for rotating the object camera CO (step S39). Specifically, based on the operation direction and the operation amount of the right analog stick of the controller, the watcher terminal calculates the rotation direction and the rotation amount of the object camera CO in the virtual space. Then, using the calculated rotation direction and rotation amount, the watcher terminal updates the arm vector VO of the object camera parameters stored in the memory. Consequently, the arm vector VO rotates about a straight line parallel to the y-axis (FIG. 10).

When the process of step S35 is performed, or when the determination is NO in step S34, or when the process of step S39 is performed, or when the determination is NO in step S38, the watcher terminal determines whether or not the orientation of the controller of the watcher terminal changes (step S40). Specifically, based on the accelerations and/or the angular velocities detected by the inertial sensors 18 of the controller and included in the operation data, the watcher terminal determines whether or not the orientation of the controller in real space changes.

When it is determined that the orientation of the controller changes (step S40: YES), the watcher terminal performs an orientation change process for the virtual camera (step S41). Specifically, when the determination is YES in step S31, then based on the change in the orientation of the controller, the watcher terminal calculates the pitch angle α and the yaw angle β in the camera coordinate system of the bird's-eye camera CB. Next, based on the arm vector VB and the pitch angle α and the yaw angle β in the camera coordinate system of the bird's-eye camera CB, the watcher terminal calculates the pitch angle Gα and the yaw angle Gβ in the xyz coordinate system. Then, the watcher terminal stores the calculated pitch angle Gα and yaw angle Gβ in the xyz coordinate system as the orientation information of the bird's-eye camera parameters in the memory. Further, when the determination is YES in step S36, then based on the change in the orientation of the controller, the watcher terminal calculates the pitch angle α and the yaw angle β in the camera coordinate system of the object camera CO. Then, based on the arm vector VO and the pitch angle α and the yaw angle β in the camera coordinate system of the object camera CO, the watcher terminal calculates the pitch angle Gα and the yaw angle Gβ in the xyz coordinate system and stores the calculated pitch angle Gα and yaw angle Gβ in the xyz coordinate system as the orientation information of the object camera parameters in the memory.

When the process of step S41 is performed, or when the determination is NO in step S40, or when the determination is NO in step S36, then based on the reception data, the watcher terminal sets the camera parameters of each player camera CP (step S42). Specifically, based on the reception data, the watcher terminal calculates the gaze point FP of each player camera CP from the position of each player character P. Further, the watcher terminal acquires the arm vector VP and the pitch angle Gα and the yaw angle Gβ in the xyz coordinate system of each player camera CP from the reception data. Then, the watcher terminal stores the acquired information as the player camera parameters of each player camera CP in the memory.

When the process of step S42 is performed, the watcher terminal ends the processing shown in FIG. 25.

Referring back to FIG. 23, after the game processing in step S12, the watcher terminal determines whether or not a switching operation for switching the virtual cameras is performed (step S13). When a switching operation for switching the cameras is performed (step S13: YES), then in accordance with the switching operation, the watcher terminal switches the virtual cameras (step S14). Specifically, the watcher terminal stores, in the "currently-used camera information", information indicating that the virtual cameras are being switched. Here, the virtual cameras are switched for a plurality of frame times.

When the determination is NO in step S13, or when the process of step S14 is executed, the watcher terminal determines whether or not the virtual cameras are being switched (step S15). Specifically, with reference to the currently-used camera information, the watcher terminal determines whether or not the virtual cameras are currently being switched.

When it is determined that the virtual cameras are being switched (step S15: YES), then based on the camera parameters of the virtual camera before the switching and the camera parameters of the virtual camera after the switching, the watcher terminal calculates camera parameters (step S16). Specifically, the watcher terminal interpolates by the Hermitian interpolation method the camera parameters of the virtual camera before the switching and the camera parameters of the virtual camera after the switching, thereby calculating each camera parameter of a virtual camera that is being switched. For example, when the virtual camera before the switching is the player camera CPa, and the virtual camera after the switching is the bird's-eye camera CB, the watcher terminal interpolates the gaze point FPa of the player camera CPa and the gaze point FB of the bird's-eye camera CB by the Hermitian interpolation method, thereby calculating the gaze point F of the virtual camera that is being switched. Similarly, the watcher terminal interpolates the arm vector VPa of the player camera CPa and the arm vector VB of the bird's-eye camera CB by the Hermitian interpolation method, thereby calculating the arm vector V of the virtual camera that is being switched. Further, the watcher terminal interpolates the pitch angle Gα in the xyz coordinate system of the player camera CPa and the pitch angle Gα in the xyz coordinate system of the bird's-eye camera CB by the Hermitian interpolation method, thereby calculating the pitch angle Gα in the xyz coordinate system of the virtual camera that is being switched. Further, the watcher terminal interpolates the yaw angle Gβ in the xyz coordinate system of the player camera CPa and the yaw angle Gβ in the xyz coordinate system of the bird's-eye camera CB by the Hermitian interpolation method, thereby calculating the yaw angle Gβ in the xyz coordinate system of the virtual camera that is being switched. Then, the watcher terminal stores the calculated camera parameters as the currently-used camera information in the memory 12.

When the determination is NO in step S15, or when the process of step S16 is executed, then based on the virtual camera, the watcher terminal generates a game image (step S17). Specifically, based on the camera parameters of the virtual camera specified by the currently-used camera information, a game image is generated. When the virtual cameras are being switched, then based on the camera parameters included in the currently-used camera information, a game image is generated. The watcher terminal displays the generated game image on the display device (step S18). Consequently, when the virtual cameras are not being switched, an image of the virtual space viewed from a specified virtual camera (a virtual camera that is being used) is displayed. Further, when the virtual cameras are being switched, an image during the switching is displayed. Thus, the watcher terminal ends the processing shown in FIG. 23.

Next, processing performed by the game apparatus 10 (the player terminal) of each player is described.

(Data Stored in Player Terminal)

Figure 26:
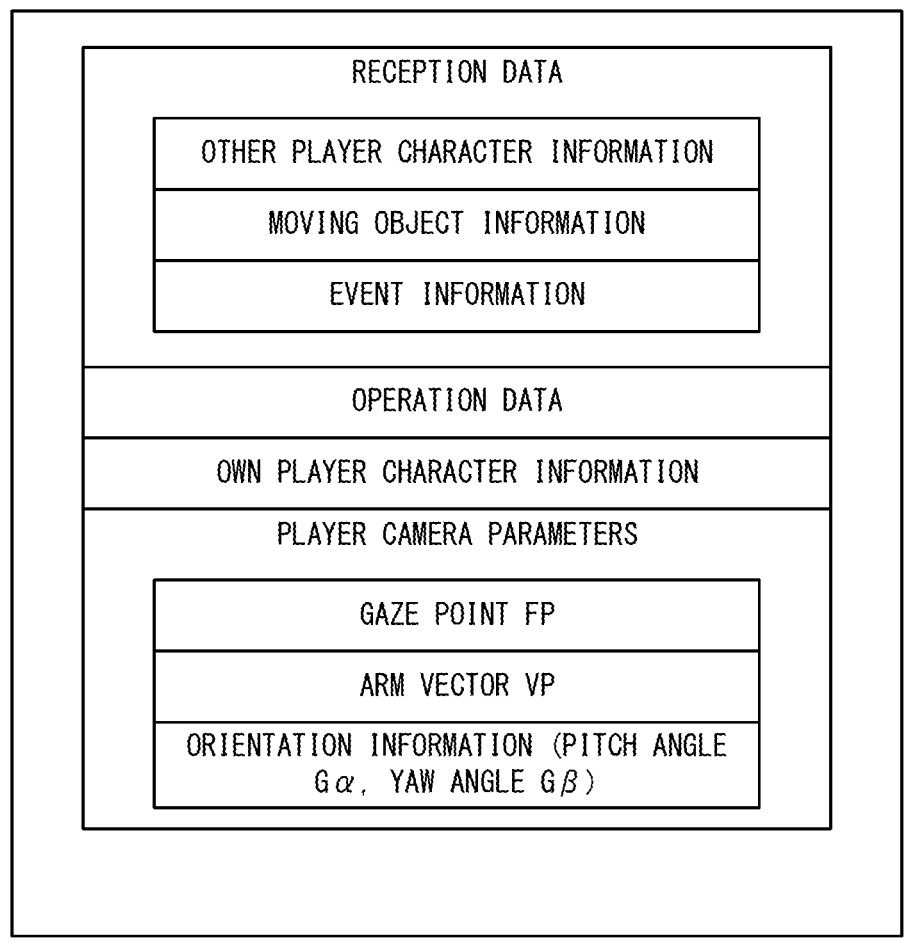
FIG. 26 is an example non-limiting diagram showing an example of data stored in a memory 12 of a player terminal.

FIG. 26 is a diagram showing an example of data stored in the memory 12 of the player terminal.

As shown in FIG. 26, while the game program is executed, reception data, operation data, own player character information, and player camera parameters are stored in the player terminal. It should be noted that in the player terminal, various types of data and programs other than those shown in FIG. 26 are also stored.

The reception data is data received via the network and play data generated in accordance with an operation performed on another game apparatus 10. Specifically, the reception data includes "other player character information", "moving object information", and "event information". The "other player character information" is information regarding each player character P corresponding to another game apparatus 10 (the position, the direction, the moving direction, the moving velocity, the jump velocity, and the like). This information is similar to the player character information stored in the watcher terminal and described in FIG. 22, and therefore is not described in detail here.

The "operation data" is data corresponding to an operation on the controller of the player terminal. The "own player character information" is information regarding the player character P corresponding to the player terminal and includes the position, the direction, the moving direction, the moving velocity, the jump velocity, and the like of the player character P.

The player camera parameters are the camera parameters of the player camera CP following the player character P corresponding to the player terminal. The player camera parameters include the gaze point FP, the arm vector VP, and the orientation information. This information is similar to the information stored in the watcher terminal and described in FIG. 22, and therefore is not described in detail here.

(Details of Processing Performed by Player Terminal)

Figure 27:
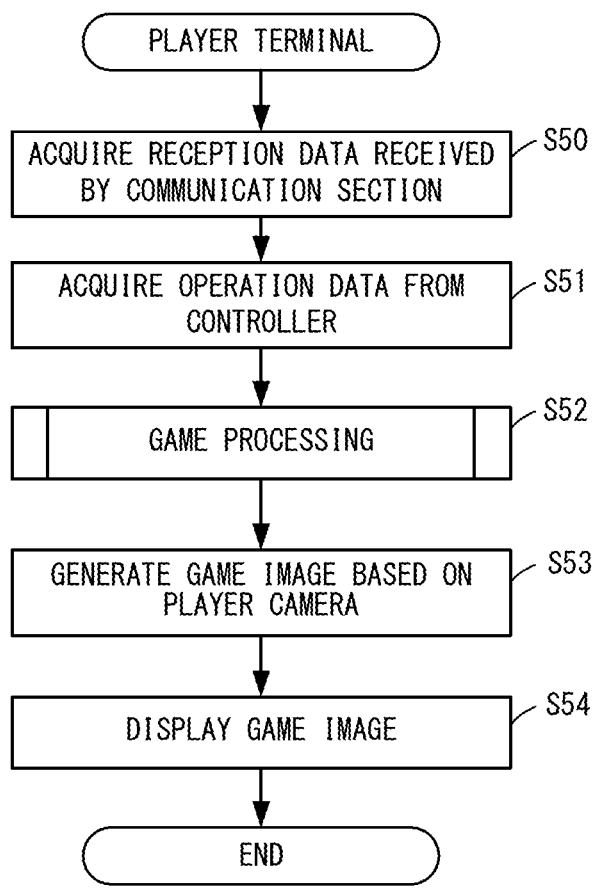
FIG. 27 is an example non-limiting flow chart showing the details of information processing performed by the player terminal.

Next, the details of processing performed by the game apparatus 10 of the player are described. FIG. 27 is a flow chart showing the details of information processing performed by the player terminal. In FIG. 27, processes similar to those in FIG. 23 are not described. It should be noted that the processing shown in FIG. 27 is performed by the processor 11 of the player terminal executing a predetermined game program (an information processing program). The processor 11 of the player terminal repeatedly executes the processing shown in FIG. 27, for example, at ⅟₆₀-second intervals (one frame time).

As shown in FIG. 27, the processor 11 of the player terminal (hereinafter referred to simply as the "player terminal" in flow charts) acquires reception data received by the communication section 14 via the network (step S50) and acquires operation data from the controller of the player terminal (step S51).

Figure 28:
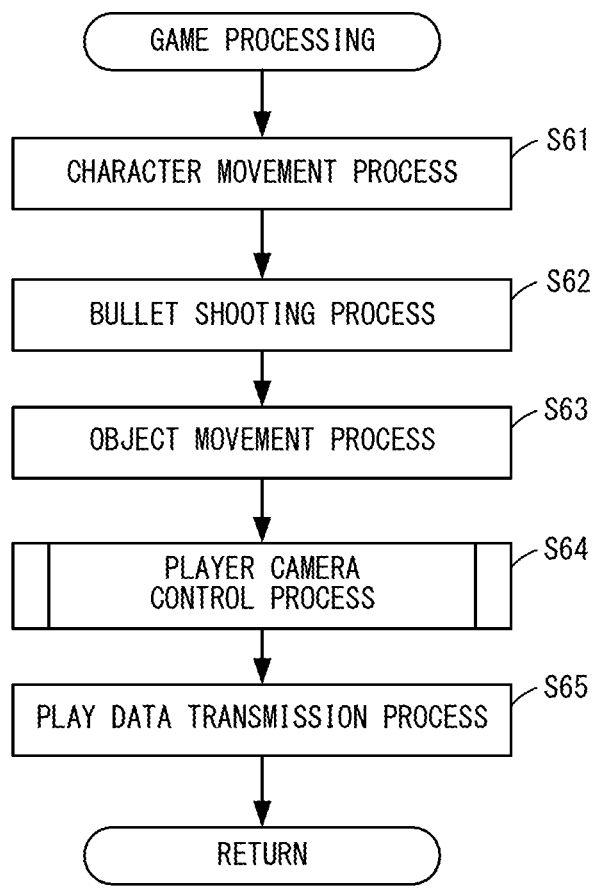
FIG. 28 is an example non-limiting flow chart showing the details of game processing in step S52 in FIG. 27.

Next, using the reception data acquired in step S50 and the operation data acquired in step S51, the player terminal executes game processing (step S52). With reference to FIG. 28, the details of the game processing in step S52 are described below.

(Game Processing Performed by Player Terminal)

FIG. 28 is a flow chart showing the details of the game processing in step S52 in FIG. 27.

As shown in FIG. 28, the player terminal performs a character movement process (step S61). Specifically, in the character movement process, based on the operation data acquired in step S51, the player terminal calculates the position, the direction, the moving direction, the moving velocity, the jump velocity, and the like of the player character P of the player terminal and causes the player character P of the player terminal to move in the virtual space, jump, or change its direction. The information such as the position of the player character P calculated based on the operation data is stored as the own player character information in the memory 12. The own player character information stored here will be transmitted as play data to the other game apparatuses 10 in a play data transmission process in step S65 described later.

Further, in the character movement process in step S61, based on the reception data acquired in step S50, the player terminal causes another player character corresponding to another game apparatus 10 to move in the virtual space, jump, or change its direction.

Next, the player terminal performs a bullet shooting process (step S62). In the bullet shooting process, based on the operation data acquired in step S51, the player terminal determines whether or not the player character P of the player terminal shoots a bullet. When the player character P of the player terminal shoots a bullet, the player terminal calculates the shooting direction of the bullet and causes the player character P of the player terminal to shoot the bullet. Specifically, the player terminal causes the player character P of the player terminal to shoot the bullet in the image capturing direction of the player camera CP corresponding to the player character P of the player terminal. Consequently, for example, the bullet is shot toward the center of the screen of the display device of the player terminal. When the bullet is shot based on the operation data, information indicating that the bullet is shot and information indicating the shooting direction of the bullet are stored as play data in the memory 12. The play data stored here will be transmitted to the other game apparatuses 10 in the play data transmission process in step S65 described later.

Further, in the bullet shooting process in step S62, based on the reception data acquired in step S50, the player terminal moves in the virtual space a bullet shot by another player character corresponding to another game apparatus 10. The reception data includes event information indicating that another player character shoots a bullet, and based on the event information, the player terminal moves in the virtual space the bullet shot by the other player character.

Next, the player terminal performs an object movement process (step S63). For example, when the player character P of the player terminal is located on the moving object TO, the player terminal moves the moving object TO in accordance with a predetermined path. In this case, the player terminal stores information regarding the position and the moving direction after the movement of the moving object TO as play data in the memory. The play data stored here will be transmitted to the other game apparatuses 10 in the play data transmission process in step S65 described later. Further, for example, based on the moving object information of the reception data, the player terminal moves the moving object TO.

Figure 29:
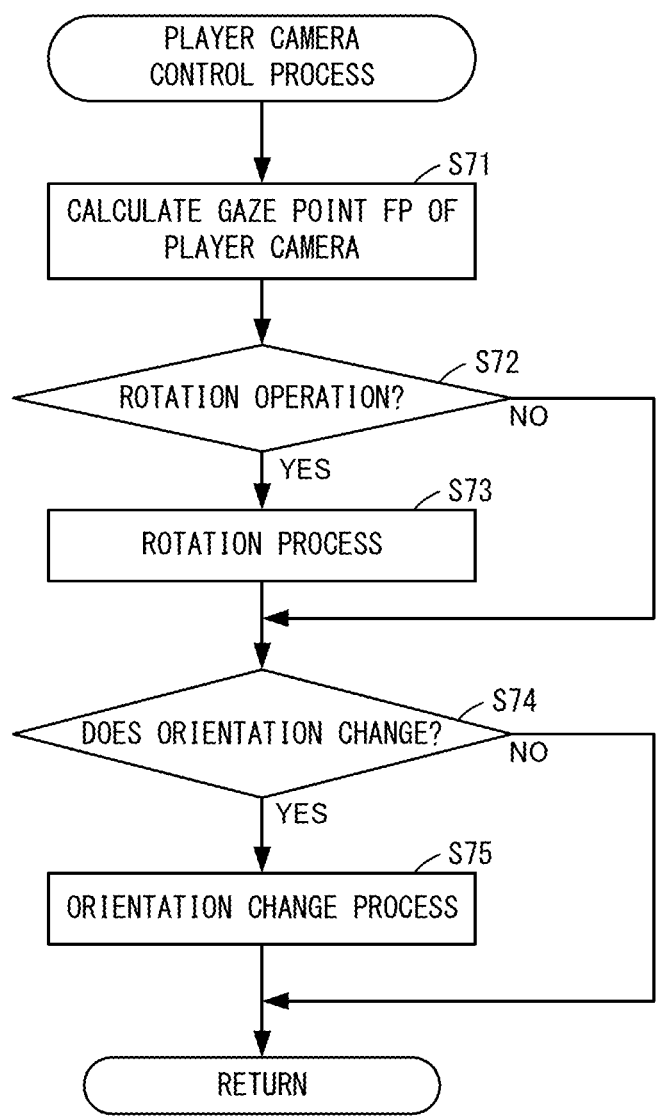
FIG. 29 is an example non-limiting flow chart showing the details of a player camera control process in step S64 in FIG. 28.

Next, the player terminal performs a player camera control process (step S64). With reference to FIG. 29, the details of the player camera control process in step S64 are described below.

(Player Camera Control Process Performed by Player Terminal)

FIG. 29 is a flow chart showing the details of the player camera control process in step S64 in FIG. 28.

As shown in FIG. 29, the player terminal calculates the gaze point FP of the player camera CP from the position of the player character P and stores the calculated gaze point FP in the memory 12 (step S71). The gaze point FP is set to, for example, a position a predetermined distance away from the position of the player character P in the y-axis direction. Next, based on the operation data, the player terminal determines whether or not a rotation operation for rotating the player camera CP is performed (step S72). Specifically, the player terminal determines whether or not the right analog stick of the controller is operated.

When a rotation operation for rotating the player camera CP is performed (step S72: YES), the player terminal performs a rotation process for rotating the player camera CP (step S73). Specifically, based on the operation direction and the operation amount of the right analog stick of the controller, the player terminal calculates the rotation direction and the rotation amount of the player camera CP. Then, using the calculated rotation direction and rotation amount, the player terminal rotates the arm vector VP of the player camera parameters stored in the memory 12.

When the process of step S73 is performed, or when the determination is NO in step S72, the player terminal determines whether or not the orientation of the controller of the player terminal changes (step S74). Specifically, based on the accelerations and/or the angular velocities detected by the inertial sensors 18 of the controller, the player terminal determines whether or not the orientation of the controller in real space changes.

When it is determined that the orientation of the controller changes (step S74: YES), the player terminal performs an orientation change process for the player camera CP (step S75). Specifically, based on the change in the orientation of the controller, the player terminal calculates the pitch angle α and the yaw angle β in the camera coordinate system of the player camera CP. Then, based on the arm vector VP and the pitch angle α and the yaw angle β in the camera coordinate system of the player camera CP, the player terminal calculates the pitch angle Gα and the yaw angle Gβ in the xyz coordinate system and stores the calculated pitch angle Gα and yaw angle Gβ in the xyz coordinate system as the orientation information of the player camera parameters in the memory 12.

When the process of step S75 is performed, or when the determination is NO in step S74, the player terminal ends the processing shown in FIG. 29.

Referring back to FIG. 28, after the process of step S64, the player terminal performs a play data transmission process (step S65). Here, play data is data generated based on an operation performed on the player terminal. Specifically, the player terminal transmits data regarding the position, the direction, the moving direction, the moving velocity, the jump velocity, and the like of the player character P after the character movement process in step S61 is performed, as the play data to the network via the communication section 14. Further, when the player character P of the player terminal shoots the bullet in the bullet shooting process in step S62, the player terminal transmits the event information including information regarding the shooting direction of the bullet, as the play data to the network via the communication section 14. Further, when the player character P of the player terminal moves the moving object TO in the object movement process in step S63, the player terminal transmits information regarding the position and the moving direction of the moving object TO as the play data to the network via the communication section 14. Further, the player terminal transmits the orientation information (the pitch angle Gα and the yaw angle Gβ in the xyz coordinate system) of the player camera CP calculated in the player camera control process in step S64, as the play data to the network via the communication section 14. The play data transmitted in step S65 is received by the watcher terminal in step S10 in FIG. 23 and also received by the other player terminals in the above step S50.

After the process of step S65, the player terminal ends the processing in FIG. 28.

Referring back to FIG. 27, based on the player camera CP, the player terminal generates a game image (step S53). Then, the player terminal displays the generated game image on the display device (step S54).

It should be noted that the above processing is merely illustrative, and for example, the order of the steps may be changed, another step may be added, or some of the steps may be omitted.

As described above, in the exemplary embodiment, a plurality of player terminals and a watcher terminal are connected to a network, and a plurality of players perform a game. A watcher can watch the game performed by the plurality of players. The watcher can specify any of a first mode (a mode where the bird's-eye camera CB in the zoom mode is used), a second mode (a mode where the player camera CP of each player is used), a third mode (a mode where the object camera CO is used), and a fourth mode (a mode where the bird's-eye camera CB in the entirety mode is used) regarding virtual cameras and watch the game using the virtual camera in the specified mode.

In the first mode, the watcher can move the bird's-eye camera CB in the zoom mode in the virtual space. Based on a movement operation on the controller of the watcher terminal, the bird's-eye camera CB is moved so that the height of the bird's-eye camera CB is a height set in advance in accordance with a position specified based on the movement operation (the gaze point FB of the bird's-eye camera CB or the viewpoint of the bird's-eye camera CB). Specifically, a height map is set in the virtual space. The height map is set at a position higher than those of all objects present in the virtual space. Based on the movement operation of the watcher, the gaze point FB of the bird's-eye camera CB moves on the height map. The viewpoint of the bird's-eye camera CB is set at a position a predetermined distance (which may be fixed or may be variable in accordance with an operation of the watcher) away from the gaze point FB in a predetermined direction.

The movement of the bird's-eye camera CB is thus controlled, whereby the watcher can move the bird's-eye camera CB in the virtual space and view a desired place in the virtual space. At this time, the height of the bird's-eye camera CB has an appropriate value set in advance, and therefore, the watcher can easily perform a movement operation for moving a virtual camera. For example, when the watcher needs to manually adjust the virtual camera also in the height direction in addition to the left-right direction in the virtual space where there is a large difference in height, it is difficult to move the virtual camera to the position where it is easy to view the virtual space. In the exemplary embodiment, since the position in the height direction of the virtual camera is automatically determined, the watcher can quickly move the virtual camera to the position where it is easy to view the virtual space. Further, since the position in the height direction of the virtual camera is automatically determined, when the height map is set at a position higher than those of geographical objects, it is possible to prevent the virtual camera from coming into contact with or coming too close to the geographical objects.

Further, since the height of the bird's-eye camera is determined in advance, when the virtual camera is switched to the bird's-eye camera, it is possible to prevent the virtual camera from being switched to an inappropriate viewpoint (e.g., the position where it is too close to a geographical object, or the inside of a geographical object). Thus, the watcher can perform realistic watching while switching the virtual camera according to circumstances from a first viewpoint to a second viewpoint and further to a third viewpoint.

Further, in the exemplary embodiment, when the virtual cameras are switched, the positions and the directions of the virtual cameras during the switching are calculated, and a game image during the switching of the virtual cameras is displayed on the display device. Thus, the watcher can view the state where the virtual cameras move from the position of the virtual camera before the switching to the position of the virtual camera after the switching, and can easily understand the positional relationship between the virtual cameras before the switching and after the switching.

(Variations)

While the exemplary embodiment has been described above, another exemplary embodiment may be configured as follows.

For example, in the above exemplary embodiment, based on a movement operation of the watcher, the gaze point of the bird's-eye camera CB is moved on the control surfaces, thereby moving the viewpoint of the bird's-eye camera. In another exemplary embodiment, based on a movement operation of the watcher, the viewpoint of the bird's-eye camera CB may be moved on the control surfaces. In this case, the control surfaces may be set to positions higher than those of the geographical objects, the player objects, and any other objects in the virtual space.

Further, in the above exemplary embodiment, the moving object TO moves in the virtual space in accordance with a predetermined path, and the object camera CO moves following the moving object TO. In another exemplary embodiment, the moving object TO may move in accordance with an operation of a player. For example, the moving object TO may be a particular object held by a player character P. For example, the following game may be performed. When the player character P carries the particular object by holding the particular object to a particular place in the virtual space, the player or the corresponding team wins. In this case, the particular object is an important object that affects the outcome of the game, and the object camera CO moves following the particular object. Since the object camera CO moves following the particular object, the watcher can always watch the periphery of the particular object, using the object camera CO. Also in this case, the object camera CO may be able to rotate about the particular object, or the orientation of the object camera CO may be able to change.

Further, the object camera CO may be fixed to a particular object that does not move in the virtual space. For example, the following game may be performed. When a particular area in the virtual space is painted with liquid, the player or the corresponding team wins. In this case, the particular area is an important object that affects the outcome of the game. Thus, the object camera CO is fixed to the particular area, whereby the watcher can always watch the periphery of the particular area. It should be noted that also in a case where the object camera CO is fixed to the particular object, the object camera CO may be able to rotate about the particular object, or the orientation of the object camera CO may be able to change.

Further, in the above exemplary embodiment, based on an operation on each game apparatus 10, the position or the direction of the player character and the gaze point or the direction of each virtual camera are calculated in the game apparatus 10, and the calculation results are transmitted as play data. In another exemplary embodiment, raw operation data corresponding to an operation on each game apparatus 10 (e.g., data indicating that one of the operation buttons of the controller is pressed, data indicating the operation direction and the operation amount of one of the analog sticks of the controller, data from the inertial sensors, or the like) may be transmitted as play data. In this case, each game apparatus 10 may receive raw operation data corresponding to an operation on another game apparatus 10, and based on the received raw operation data, calculate the position or the direction of the player character corresponding to the other game apparatus 10, the position or the direction of each virtual camera, and the like.

Further, in the above exemplary embodiment, a plurality of game apparatuses 10 are connected to the Internet and perform the above game via the Internet. In another exemplary embodiment, the plurality of game apparatuses 10 may be connected to the same LAN, and the above game may be performed in the same place. In this case, the plurality of game apparatuses 10 perform the game not via the server. Further, in this case, the plurality of game apparatuses 10 may be connected to each other in a wireless or wired manner and directly communicate with each other, or may communicate with each other via, for example, a wireless LAN access point.

Further, in the above exemplary embodiment, a plurality of game apparatuses 10 communicate with each other via the server on the Internet. Alternatively, in another exemplary embodiment, the plurality of game apparatuses 10 may directly communicate with each other via the Internet not via the server.

Further, in the above exemplary embodiment, the processing shown in the flow charts is performed by each game apparatus 10. In another exemplary embodiment, the above processing may be executed by any of the player terminals, the watcher terminal, and the server included in the game system, and at least a part of the above processing may be executed by the server on the Internet.

For example, the configuration may be such that each game apparatus 10 performs only the process of receiving an operation of the player or the watcher, and the process of displaying a game image, and the server executes other processes. For example, each player terminal may transmit operation data corresponding to an operation of the player as play data to the server. The server receives the operation data from each game apparatus 10, performs the character movement process, the bullet shooting process, the object movement process, the camera parameter update process, and the player camera control process that are described above, and generates a game image based on the results of the processes. Then, the server may transmit the generated game image to each game apparatus 10 (the player terminals and the watcher terminal), thereby displaying the game image on the display device of the game apparatus 10.

Further, for example, each player terminal may perform the above character movement process based on an operation of the player and transmit the result of the process as play data to the server. In this case, based on the play data received from each player terminal, the server performs other processes (the bullet shooting process, the object movement process, the camera parameter update process, the player camera control process, and the like). The server transmits the results of the processes to each game apparatus 10. Based on the received results of the processes, each game apparatus 10 (the player terminals and the watcher terminals) generates a game image. Then, the game apparatus 10 may display the generated game image on the display device.

Further, in the above exemplary embodiment, as a multiplay game, a competition game where a plurality of players compete against each other is performed, and a game where shooting is performed in the competition game is performed. In another exemplary embodiment, not only a competition game and a game where shooting is performed, but also any game (e.g., a role-playing game, a racing game, or the like) may be performed.

Further, in the above exemplary embodiment, a game apparatus 10 performs the above game. Alternatively, another information processing apparatus (e.g., a personal computer, a smartphone, a tablet terminal, or the like) other than a game apparatus may perform the above game.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory storage medium having stored therein an information processing program executable by a computer of an information processing apparatus, the information processing program, when executed, causing the computer to at least:
   acquire play data generated based on an operation performed by another player on another information processing apparatus while a multiplay game is executed;
   update, in a virtual space where the multiplay game is performed and based on the acquired play data, a position of at least one object including a player character operated by the other player;
   based on an instruction from an operator, switch a mode regarding a virtual camera in the virtual space to one of at least a first mode and a second mode;
   in the first mode and based on a movement operation of the operator, move the virtual camera so that a height of the virtual camera is a height set in advance in accordance with a position specified based on the movement operation;
   in the second mode and based on the acquired play data, move the virtual camera by following a specified object;
   when the mode is switched, move the virtual camera from a position of the virtual camera in the mode before the switch to a position of the virtual camera in the mode after the switch, and also calculate and update a direction of the virtual camera during the movement; and
   based on the virtual camera, generate a game image of the virtual space.

2. The non-transitory storage medium having stored therein the information processing program according to claim 1, wherein the specified object is the player character operated by the other player.

3. The non-transitory storage medium having stored therein the information processing program according to claim 2, wherein:
   in the other information processing apparatus, based on an operation of the other player, the player character corresponding to the other player and a position and a direction of the virtual camera corresponding to the player character are controlled, and a game image based on the virtual camera is generated, and
   the information processing program, when executed, further causes the computer to at least in the second mode control the virtual camera based on the play data and so that the position and the direction of the virtual camera are the same as a position and a direction of a virtual camera controlled by the other information processing apparatus in which the specified player character is operated.

4. The non-transitory storage medium having stored therein the information processing program according to claim 1, wherein:
   a height map including at least one surface is set in the virtual space, and
   a gaze point or a viewpoint of the virtual camera is moved on the surface of the height map based on the movement operation, in the first mode.

5. The non-transitory storage medium having stored therein the information processing program according to claim 4, wherein in the first mode and based on the movement operation, the gaze point of the virtual camera is moved on the surface of the height map and a position a certain distance away from the gaze point in a certain direction is determined as the viewpoint of the virtual camera.

6. The non-transitory storage medium having stored therein the information processing program according to claim 5, wherein the information processing program, when executed, further causes the computer to at least change an orientation of the virtual camera at the determined viewpoint of the virtual camera based on an operation of the operator.

7. The non-transitory storage medium having stored therein the information processing program according to claim 1, wherein:
   based on an instruction from the operator, the mode regarding the virtual camera is switched to a third mode, and the information processing program, when executed, further causes the computer to at least move, in the third mode, the virtual camera by following an object other than the player character.

8. The non-transitory storage medium having stored therein the information processing program according to claim 1, wherein:
based on an instruction from the operator, the mode regarding the virtual camera is switched to a fourth mode, and
the information processing program, when executed, further causes the computer to at least set, in the fourth mode, the virtual camera at a certain position in the virtual space.

9. The non-transitory storage medium having stored therein the information processing program according to claim 1, wherein the acquired play data at least includes the position of the player character and the direction of the virtual camera corresponding to the player character.

10. The non-transitory storage medium having stored therein the information processing program according to claim 1, wherein the multiplay game is a game where based on an instruction from a player, shooting is performed in a direction corresponding to the direction of the virtual camera corresponding to the player character.

11. An information processing system, including a plurality of information processing apparatuses, for executing a multiplay game, the information processing system comprising:
at least one processor configured to at least:
generate play data based on an operation performed by a player on a first information processing apparatus among the plurality of information processing apparatuses;
update, in a virtual space where the multiplay game is performed and based on the play data, a position of at least one object including a player character operated by the player;
based on the play data, control a first virtual camera in the virtual space, and based on the first virtual camera, generate a game image of the virtual space, and display the generated game image on a display device of the first information processing apparatus;
based on an instruction from an operator of a second information processing apparatus among the plurality of information processing apparatuses, switch a mode regarding a second virtual camera in the virtual space to one of at least a first mode and a second mode;
in the first mode and based on a movement operation of the operator of the second information processing apparatus, move the second virtual camera so that a height of the second virtual camera is a height set in advance in accordance with a position specified based on the movement operation;
in the second mode and based on the play data, move the second virtual camera by following a specified object;
when the mode is switched, move the second virtual camera from a position of the second virtual camera in the mode before the switch to a position of the second virtual camera in the mode after the switch, and calculate and update a direction of the second virtual camera during the movement; and
generate a game image of the virtual space based on the second virtual camera and display the generated game image on a display device of the second information processing apparatus.

12. The information processing system according to claim 11, wherein the specified object is the player character operated by the player of the first information processing apparatus.

13. The information processing system according to claim 12, wherein the at least one processor is further configured to at least:
in the first mode and based on the play data, control a position and a direction of the first virtual camera, and
in the second mode and based on the play data, control the second virtual camera so that the position and the direction of the second virtual camera are the same as the position and the direction of the first virtual camera.

14. The information processing system according to claim 11, wherein:
a height map including at least one surface is set in the virtual space, and
a gaze point or a viewpoint of the second virtual camera is moved on the surface of the height map based on the movement operation, in the first mode.

15. The information processing system according to claim 14, wherein in the first mode and based on the movement operation, the gaze point of the second virtual camera is moved on the surface of the height map and a position a certain distance away from the gaze point in a certain direction is determined as the viewpoint of the second virtual camera.

16. The information processing system according to claim 15, wherein the at least one processor is further configured to at least, based on an operation of the operator, change an orientation of the second virtual camera at the determined viewpoint of the second virtual camera.

17. The information processing system according to claim 11, wherein the at least one processor is further configured to at least:
based on an instruction from the operator, further switch the mode regarding the second virtual camera to a third mode, and
in the third mode, move the second virtual camera by following an object other than the player character.

18. The information processing system according to claim 11, wherein the at least one processor is further configured to at least:
based on an instruction from the operator, further switch the mode regarding the second virtual camera to a fourth mode, and
in the fourth mode, set the second virtual camera at a position in the virtual space.

19. The information processing system according to claim 11, wherein the play data at least includes the position of the player character operated by the player of the first information processing apparatus and a direction of the first virtual camera.

20. The information processing system according to claim 11, wherein the multiplay game is a game where based on an instruction from the player, shooting is performed in a direction corresponding to a direction of the first virtual camera.

21. An information processing apparatus, comprising:
at least one processor configured to at least:
acquire play data generated based on an operation performed by another player on another information processing apparatus while a multiplay game is executed;

update, in a virtual space where the multiplay game is performed and based on the acquired play data, a position of at least one object including a player character operated by the other player;

based on an instruction from an operator, switch a mode regarding a virtual camera in the virtual space to one of at least a first mode and a second mode;

in the first mode and based on a movement operation of the operator, move the virtual camera so that a height of the virtual camera is a height set in advance in accordance with a position specified based on the movement operation;

in the second mode and based on the acquired play data, move the virtual camera by following a specified object;

when the mode is switched, move the virtual camera from a position of the virtual camera in the mode before the switch to a position of the virtual camera in the mode after the switch, and also calculate and update a direction of the virtual camera during the movement; and based on the virtual camera, generate a game image of the virtual space.

22. The information processing apparatus according to claim 21, wherein the at least one processor is further configured to:

based on an instruction from the operator, further switch the mode regarding the virtual camera to a third mode, and in the third mode, move the virtual camera by following an object other than the player character.

23. The information processing apparatus according to claim 21, wherein the specified object is the player character operated by the other player.

24. The information processing apparatus according to claim 21, wherein:

a height map including at least one surface is set in the virtual space, and based on the movement operation, a gaze point or a viewpoint of the virtual camera is moved on the surface of the height map in the first mode.

25. The information processing apparatus according to claim 24, wherein in the first mode and based on the movement operation, the gaze point of the virtual camera is moved on the surface of the height map and a position a certain distance away from the gaze point in a certain direction is determined as the viewpoint of the virtual camera.

26. The information processing apparatus according to claim 25, wherein the at least one processor is further configured to, based on an operation of the operator, change an orientation of the virtual camera at the determined viewpoint of the virtual camera.

27. An information processing method to be performed by an information processing system, including a plurality of information processing apparatuses, for executing a multiplay game, the information processing method comprising:

generating play data based on an operation performed by a player on a first information processing apparatus among the plurality of information processing apparatuses;

updating, in a virtual space where the multiplay game is performed and based on the play data, a position of at least one object including a player character operated by the player;

based on the play data, controlling a first virtual camera in the virtual space, and based on the first virtual camera, generating a game image of the virtual space, and displaying the generated game image on a display device of the first information processing apparatus;

based on an instruction from an operator of a second information processing apparatus among the plurality of information processing apparatuses, switching a mode regarding a second virtual camera in the virtual space to one of at least a first mode and a second mode;

in the first mode and based on a movement operation of the operator of the second information processing apparatus, moving the second virtual camera so that a height of the second virtual camera is a height set in advance in accordance with a position specified based on the movement operation;

in the second mode and based on the play data, moving the second virtual camera by following a specified object;

when the mode is switched, moving the second virtual camera from a position of the second virtual camera in the mode before the switching to a position of the second virtual camera in the mode after the switching, and calculating and updating a direction of the second virtual camera during the movement; and generating a game image of the virtual space based on the second virtual camera and displaying the generated game image on a display device of the second information processing apparatus.

* * * * *